(12) United States Patent
Miller et al.

(10) Patent No.: US 10,558,482 B1
(45) Date of Patent: Feb. 11, 2020

(54) CLIENT NETWORK INSTANCES FOR RESOURCES IN PROVIDER NETWORK ENVIRONMENTS

(71) Applicant: Amazon Technologies, Inc., Seattle, WA (US)

(72) Inventors: Kevin Christopher Miller, Fairfax, VA (US); Ian Paul Nowland, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/871,690

(22) Filed: Sep. 30, 2015

(51) Int. Cl.
*G06F 9/46* (2006.01)
*G06F 9/455* (2018.01)
*H04L 29/12* (2006.01)

(52) U.S. Cl.
CPC ...... *G06F 9/45558* (2013.01); *H04L 61/2007* (2013.01); *G06F 2009/4557* (2013.01); *G06F 2009/45579* (2013.01); *G06F 2009/45595* (2013.01)

(58) Field of Classification Search
CPC ...................................................... G06F 9/455
See application file for complete search history.

(56) References Cited

U.S. PATENT DOCUMENTS

| 6,625,689 | B2 | 9/2003 | Narad et al. |
| 6,975,628 | B2 | 12/2005 | Johnson et al. |
| 8,819,195 | B2 | 8/2014 | Flavel et al. |
| 9,042,403 | B1 | 5/2015 | Vincent et al. |
| 2010/0027552 | A1* | 2/2010 | Hill .......... H04L 12/66 370/401 |
| 2012/0250686 | A1 | 10/2012 | Vincent et al. |
| 2012/0317566 | A1 | 12/2012 | Santos et al. |
| 2013/0016719 | A1 | 1/2013 | Johnsen et al. |
| 2013/0254766 | A1 | 9/2013 | Zuo et al. |
| 2014/0233423 | A1* | 8/2014 | Jha ............ H04L 12/4625 370/254 |

OTHER PUBLICATIONS

U.S. Appl. No. 14/871,690, filed Sep. 30, 2015, Kevin Christopher Miller, et al.

* cited by examiner

*Primary Examiner* — Wissam Rashid
(74) *Attorney, Agent, or Firm* — Robert C. Kowert; Kowert, Hood, Munyon, Rankin & Goetzel, P.C.

(57) ABSTRACT

Methods and apparatus that allow clients to replace standard packet processing provided by network processing devices on host devices with client network instances that provide custom packet processing for packets going to and/or coming from the clients' resource instances in a provider network environment. Thus, packet processing functionality needed by a client that may not be supported or provided by the service provider's standard packet processing may be added to the clients' private network implementations. In addition, standard private network functionality provided by the service provider may be removed, modified, or replaced using the client network instances. Development tools, services, and interfaces may be provided for developing, integrating, and managing the client network instances.

23 Claims, 18 Drawing Sheets

CLIENT NETWORK INSTANCES FOR RESOURCES IN PROVIDER NETWORK ENVIRONMENTS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers or clients. Some public data center operators provide network access, power, and secure installation facilities for hardware owned by various clients, while other public data center operators provide "full service" facilities that also include hardware resources made available for use by their clients. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many clients with diverse needs, allowing various computing resources to be efficiently and securely shared by multiple clients. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

Figure 1:
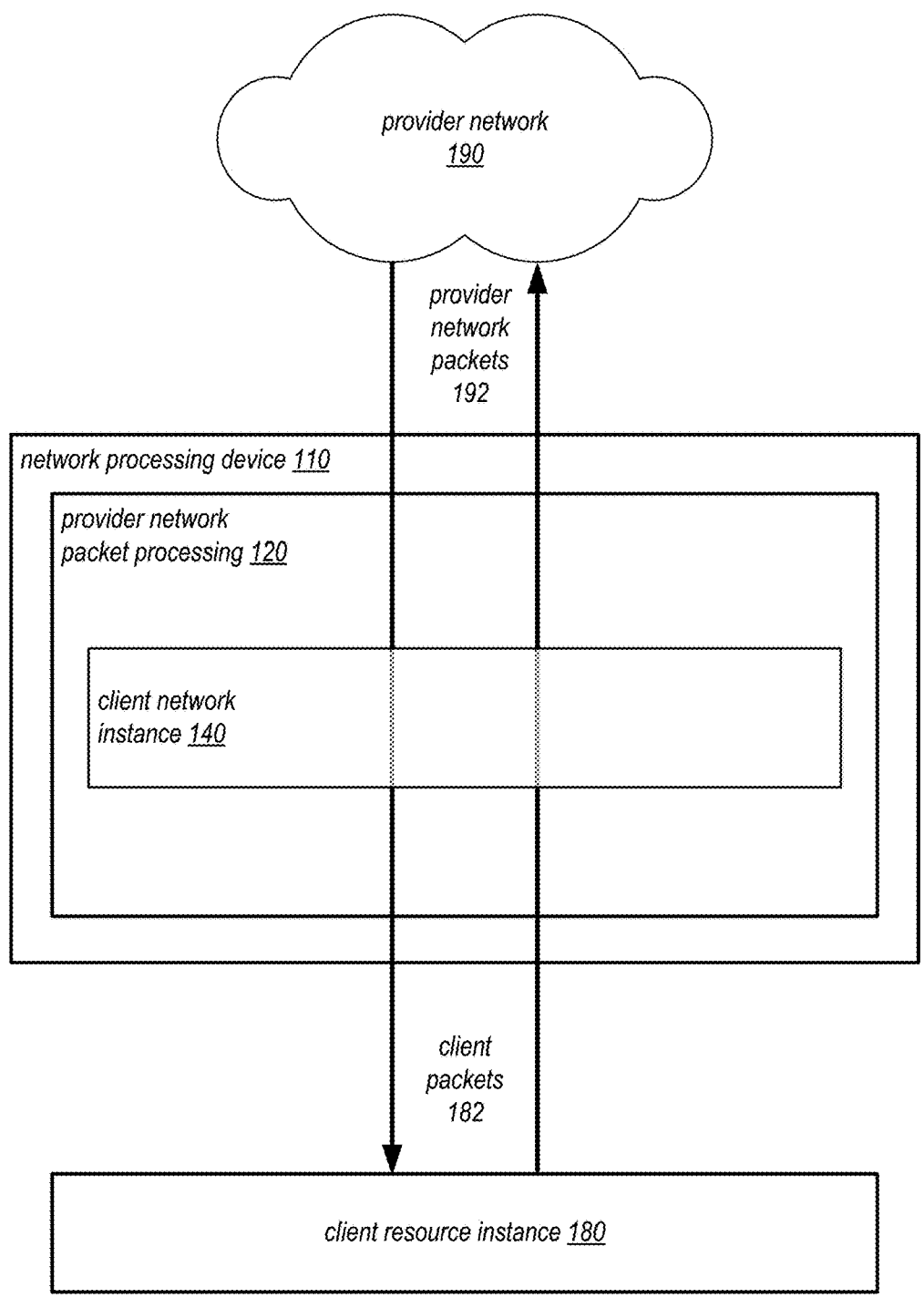
FIG. 1 illustrates a client network instance processing packets for a resource instance in a provider network environment, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for providing network instances for packet flows to and from resources in provider network environments are described. A service provider that provides a provider network for clients may provide services and application programming interfaces (APIs) that allow clients to establish and manage client private networks on the provider network. A private network in a provider network environment may be broadly defined as a network space (e.g., logically defined by an address range or address space) that contains a set of provider network resources of a respective client, and that acts as a logically isolated section on the provider network for the client's resources. A private network may implement a private or local Internet Protocol (IP) address space according to a network protocol, for example 32-bit IP addresses within an Internet Protocol version 4 (IPv4) address range or subnet. Sources (e.g., endpoints such as computation resources, storage resources, servers, host devices, etc.) on a private network may be assigned IP addresses (e.g., 32-bit IPv4 addresses) within the private network's address space.

A client's private network implementation on the provider network includes the client's resource instances, such as virtual machines (VMs) on host devices configured as virtual computing resource instances by the client. At least some of the resource instances on a provider network may be implemented according to hardware virtualization technology that enables multiple operating systems to run concurrently on a host computer, i.e. as VMs on a host device. A hypervisor, or virtual machine monitor (VMM), on the host device presents the VMs on the respective host with a virtual platform and monitors the execution of the VMs on the host device. Each VM may be provided with one or more IP addresses; the VMM on a respective host may be aware of the IP addresses of the VMs on the host.

In at least some embodiments, a host device may include or may be coupled to one or more network processing devices that process network traffic (e.g., packet flows) between the resource instances on the host device and the provider network. As a non-limiting example, a network processing device may be a Peripheral Component Interconnect (PCI) device plugged into a PCI expansion slot or PCI bus of the host device. A network processing device may, for example, connect to a host I/O interface (e.g., a PCI bus), and may receive client packets from and send client packets to VMs executing on the host device via the host I/O interface. A network processing device may also include one or more network ports connected to the provider network, and may receive provider network packets from and send provider network packets onto the provider network via the port(s). A network processing device may also include, but is not limited to, one or more processors (e.g., multicore processor(s)), a memory, and an internal I/O interface. The processor(s) may be custom or proprietary processors, or alternatively may be general-purpose processors.

A network processing device may include provider network packet processing functionality that may apply provider network-related functions to packets received by the device. For example, the provider network packet processing functionality may implement provider network encapsulation protocol technology to encapsulate and route network packets (e.g., IP packets received from resource instances on the host device) over a network substrate within the provider network, and to decapsulate IP packets targeted at the resource instance(s) on the host device and forward the decapsulated packets to the target resource instance(s). In addition, the network processing device may include private network packet processing functionality that may apply private network-related functions of the provider network to packets received by the device. For example, the private network packet processing functionality may enforce security group, access control rules, access control lists (ACLs), subnets, and/or other access control functionality for clients' private network implementations on the provider network, for example as described in reference to FIGS. 13 and 14.

Conventionally, the provider network packet processing functionality implemented on the network processing device applies a standard set of private network-related functions for all client private networks. Embodiments of methods and apparatus are described herein that allow clients to modify or replace the standard private network packet processing functionality on a network processing device with implementations of custom network functionality, referred to herein as client network instances. In some embodiments, a client network instance may be instantiated using virtualization technology to execute as a virtual machine (VM) or virtual process on the network processing device. The client network instances may be applied to all resource instances on the client's private network, or alternatively may be associated with and applied to particular resources instances. In at least some embodiments, a client may specify and configure client network instances for their client private network using the services and APIs that are used to configure and manage their virtual resource instances on their client private network. While embodiments of client network instances are described in relation to providing custom network functionality for client resource instances in client private networks on the provider network, network instances as described herein may also be provided for and associated with resource instances that are not in client private networks to provide custom network functionality for the resource instances.

Embodiments of the methods and apparatus for providing network instances for resources in provider network environments may, for example, be implemented in the context of a service provider that provides to clients or customers, via an intermediate network such as the Internet, virtualized resources (e.g., virtualized computing and storage resources) implemented on a provider network of the service provider, typically in a data center of the service provider. FIGS. 1, 4, and 5 illustrate example provider network environments in which embodiments of the methods and apparatus for providing network instances for resources in provider network environments may be implemented. FIGS. 10 through 14 and the section titled Example provider network environments further illustrate and describe example service provider network environments in which embodiments of the methods and apparatus as described herein may be implemented.

FIG. 1 illustrates a client network instance 140 processing packets for a resource instance in a provider network environment, according to some embodiments. A client may establish a private network with an address space on the provider network 190. A resource instance 180 may be assigned an address within the private network's address space. Packets sent from the resource instance 180 may be encapsulated by the network processing device 110 and routed to their destinations via the provider network 190. Packets sent to the resource instance 180 may be decapsulated by the network processing device 110 and provided to the resource instance 180.

A network processing device 110 may include provider network packet processing 120 functionality that may apply provider network-related functions to packets received by the device 110. For example, the provider network packet processing 120 functionality may implement provider network encapsulation protocol technology to encapsulate and route client packets 182 received from resource instance 180 over a network substrate within the provider network 190 as provider network packets 192, and to decapsulate IP packets 182 received in provider network packets 192 and forward the decapsulated packets 182 to the resource instance 180. In addition, the network processing device 110 may include standard private network packet processing functionality that may apply standard private network-related functions, for example security group and other access control functions, to packets processed by the device 110.

In at least some embodiments, a client may specify or provide a client network instance 140 when provisioning new resource instances 180 in their private network implementation on the provider network 190, or may specify or provide a client network instance 140 for existing resource instances 180 in their private network implementation to replace the standard private network packet processing functionality that may be provided by the network processing devices 110. In at least some embodiments, a client may specify or provide a client network instance 140 for a resource instance 180 using the service provider's services and APIs that are used to configure and manage their virtual resource instances on their client private network. In at least some embodiments, the provider network environment may provide one or more mechanisms to ensure that the client network instance 140 complies with provider network protocols and packet routing functionality, and to ensure that the client network instance 140 does not violate provider network security and isolation protocols that provide security for and isolation of client data and resource instances on the provider network. After a client installs a client network instance 140 for a resource instance 180 on their private network implementation, the network processing device 110 applies the functionality of the client network instance 140 to packets being processed through the network processing device 110 to and from the respective resource instance 180 instead of the standard private network packet processing. In some embodiments, the client network instance 140 may be instantiated using virtualization technology to execute in a virtual environment as a virtual machine (VM) or virtual process on the network processing device 110. In at least some embodiments, the provider network packet processing 120 functionality is applied to the packets to ensure that the packets conform to the provider network's encapsulation protocol and packet routing technology.

In at least some embodiments, a client network instance 140 may be prevented from modifying or tampering with packet metadata related to the provider network functionality. In at least some embodiments, the client network instance 140 may be wrapped by the provider network packet processing 120 functionality of the network processing device 110, for example to ensure compliance with provider network protocols, for example the provider network encapsulation protocol and packet routing protocols. In at least some embodiments, a client network instance 140 corresponding to a resource instance 180 may be prevented from tampering with packets or packet metadata for packets directed to other resource instances of the same client or of other clients on the respective host device. In at least some embodiments, a network processing device 110 on a host device may include two or more client network instances 140, potentially with different client network instances 140 provided by two or more different provider network clients, and thus a client network instance 140 may be wrapped by the provider network packet processing 120 functionality of the network processing device 110 to provide isolation of and security for client data and resource instances on the provider network.

In at least some embodiments, a client network instance 140 may be software code provided by the client. In some embodiments, the code may be written by the client according to specifications provided by the service provider. In some embodiments, the code may be written in any of a variety of programming languages, for example C/C++. In some embodiments, the service provider may provide a high-level, domain-specific programming language and development environment to clients via which the clients may develop their custom client network instance(s) 140. The provided programming language and development environment may provide hooks or interfaces for integrating the client's code with the provider network packet processing 120 functionality. The programming language and development environment may also "sandbox" the client's code to ensure compliance with provider network protocols, for example the provider network encapsulation protocol and packet routing protocols, and security and isolation protocols to ensure that the client's code does not go outside the bounds of its allocated resources including memory and processor resources. In some embodiments, the client may compile the code and provide an executable to the service provider for installation on network processing device(s) 110 that service the client's resource instance(s) 180. Alternatively, the client may provide the code to the service provider, and the service provider may compile the code for installation on the network processing device(s) 110.

In some embodiments, a service provider client, the service provider, and/or third-party developers may develop client network instances 140 and then offer the client network instances 140, for example through a client network instance 140 marketplace provided by the service provider, to other service provider clients for use with their client private networks.

A client network instance 140 may include any type of network packet processing functionality that the client wants or needs to apply to packets sent from and/or to the client's resource instances 180 on their private network implementation. Examples of network functionality that a client may implement for particular resource instances 180 or for an entire private network using client network instance(s) 140 may include, but are not limited to, firewalls, Wide Area Network (WAN) optimizers, Web application firewalls, or any of various type of network compliance functionality. In general, a client may configure a client network instance 140 to perform any type of analysis, modification, and/or filtering of IP packets and packet data that they want or need to apply to the IP packets coming from or going to their resource instances 180 on their private network implementation. Note that a client network instance 140 may modify packets, drop or filter packets, and/or duplicate packets according to the particular functionality implemented by the instance 140.

For example, a client may want to maintain at least part of the standard private network packet processing functionality that is provided by the network processing devices 110, while replacing, removing, adding to, or modifying some of the functionality. The client may develop or specify a client network instance 140 that implements the desired portions of the private network packet processing functionality, but that modifies, removes, replaces, or adds to parts of the functionality according to the client's particular needs. As another example, a client may want to completely remove the standard private network functionality from their private network, and thus may provide a client network instance 140 that essentially passes the packets through without applying much if any additional processing to the packets beyond that provided by the provider network packet processing 120 functionality. As another example, a client may want to replace the standard private network functionality with their own custom network functionality.

Figure 2:
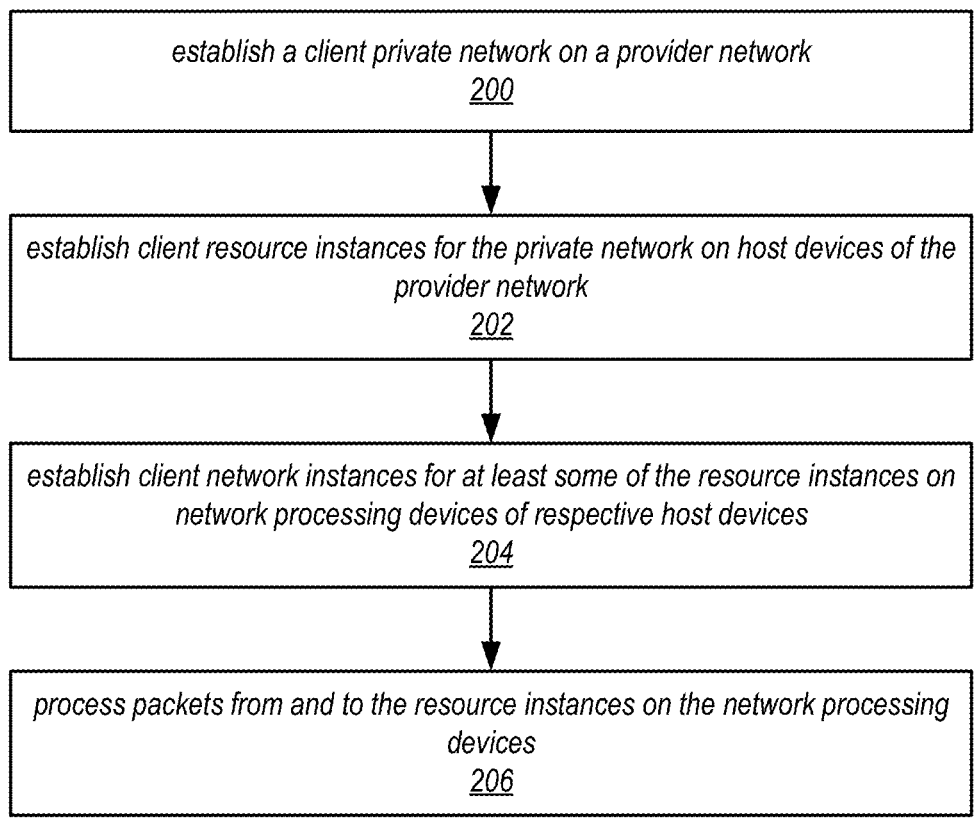
FIG. 2 illustrates an example high-level method for implementing client network instances with resource instances in a provider network environment, according to some embodiments.

FIG. 2 illustrates an example high-level method for implementing and applying client network instances 140 with resource instances 180 in a provider network environment, according to some embodiments. The method of FIG. 2 may, for example, be implemented in the provider network environment as illustrated in FIG. 1. As indicated at 200 of FIG. 2, a client may establish a client private network on a provider network 190. For example, a client may establish a private network via APIs to one or more provider network services as illustrated in FIGS. 10 through 14.

Figure 8A:
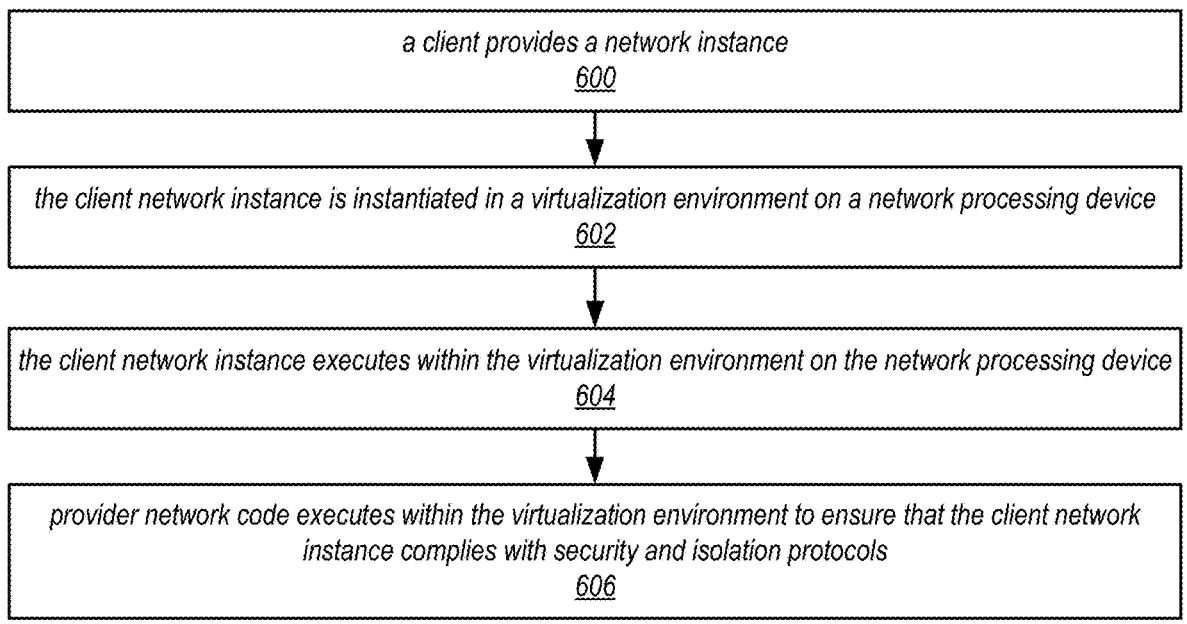
FIGS. 8A and 8B illustrate methods for generating and instantiating client network instances that provide isolation of and security for client data and resource instances on the provider network, according to some embodiments.
Figure 8B:
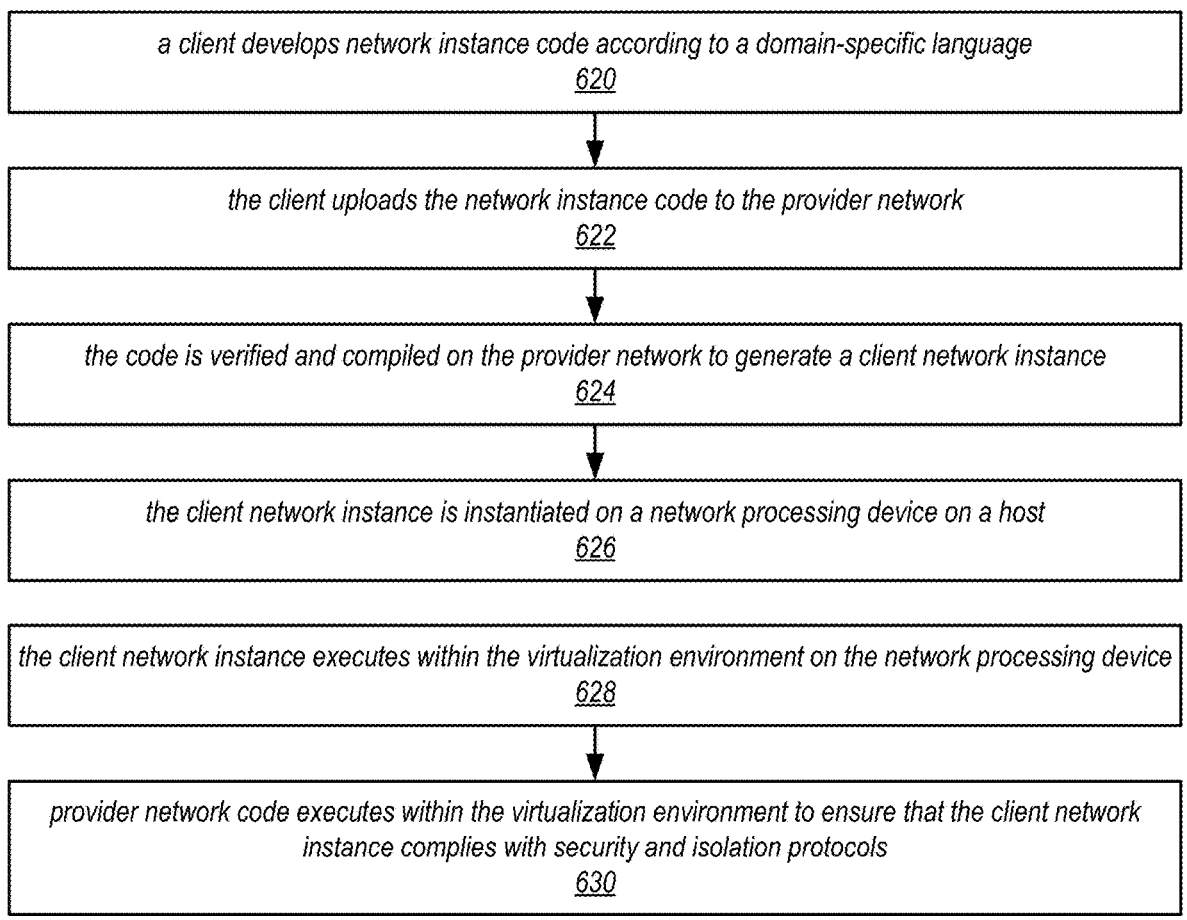

As indicated at 202 of FIG. 2, the client may provision or establish one or more virtual machines (VMs) as client resource instances 180 for the private network on host devices of the provider network. For example, a client may provision resource instances 180 for a private network via APIs to one or more provider network services as illustrated in FIG. 9. As indicated at 204 of FIG. 2, the client may establish client network instances 140 for at least some of the resource instances 180 on network processing devices 110 of respective host devices. For example, a client may select or specify existing client network instances 140 from one or more sources 830 for their resource instances 180 via APIs to one or more provider network services as illustrated in FIG. 8. Alternatively, a client may generate and upload new client network instances 140 for their resource instances 180 as illustrated in FIG. 9.

In at least some embodiments, the provider network environment may provide one or more mechanisms to ensure that a client network instance 140 complies with provider network protocols and packet routing functionality, and to ensure that the client network instance 140 does not violate provider network security and isolation protocols that provide security for and isolation of client data and resource instances on the provider network. FIGS. 8A and 8B illustrate methods for generating and instantiating client network instances 140 that provide isolation of and security for client data and resource instances on the provider network that may be used at elements 202 and 204 of FIG. 2.

Figure 3A:
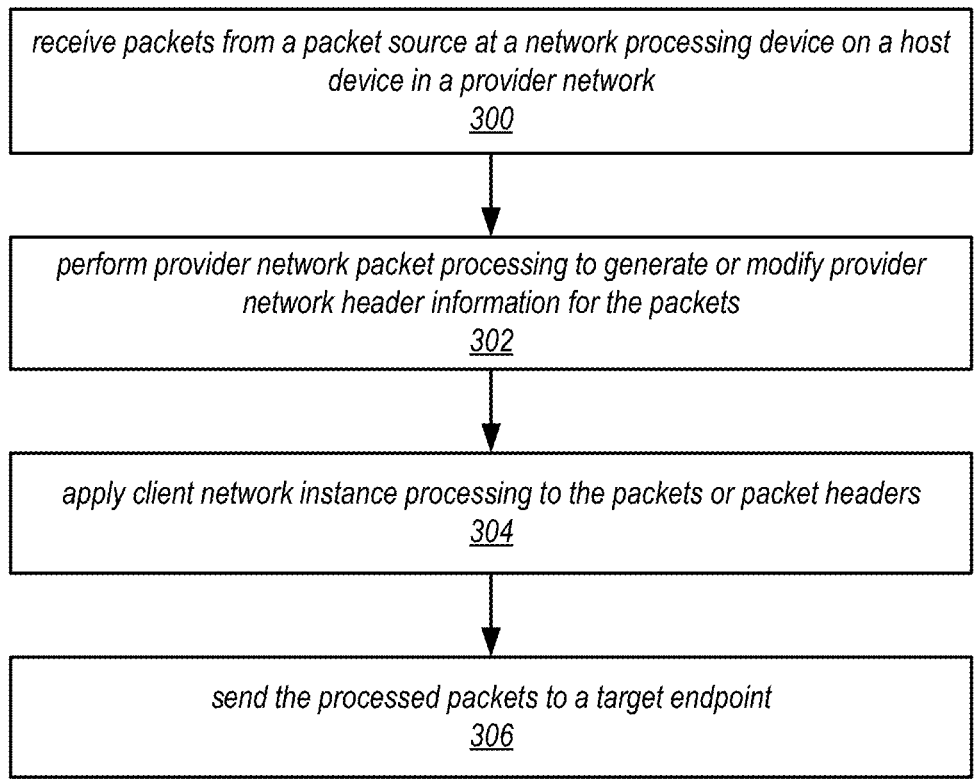
FIG. 3A illustrates an example high-level method for processing packets on a network processing device that includes client network instances, according to some embodiments.
Figure 3B:
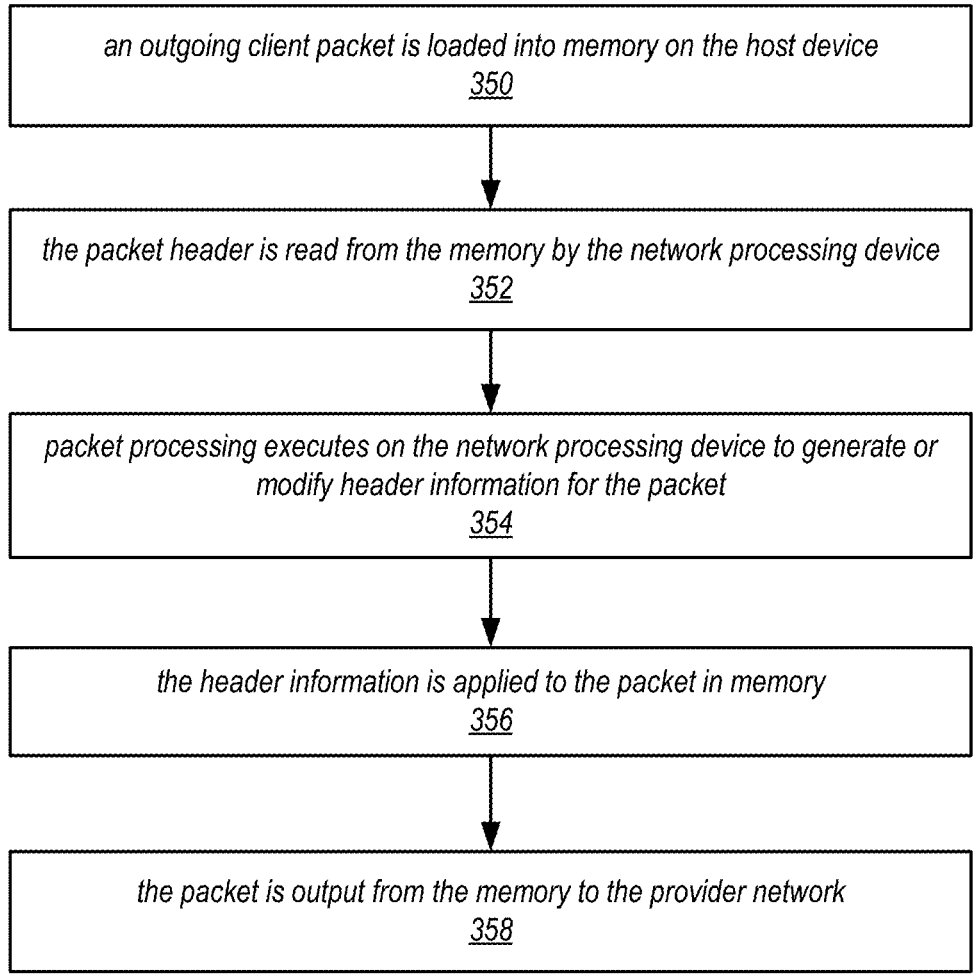
FIG. 3B illustrates a method for processing outgoing packets on a network processing device, according to some embodiments.

As indicated at 206 of FIG. 2, packets from and to the resource instances 180 may be processed on the network processing devices 110 at least in part by the client network instances 140 on the network processing devices 110, for example as illustrated in FIGS. 1, 3A, and 3B.

FIG. 3A illustrates an example high-level method for processing packets on a network processing device that includes client network instances, according to some embodiments. The method of FIG. 3A may, for example, be implemented in the provider network environment as illustrated in FIG. 1. As indicated at 300 of FIG. 3A, a network processing device 110 on a host device in a provider network may receive packets from a packet source. The packet source may be a resource instance 140 on the host machine that includes the network processing device 110, or may be an endpoint external to the host machine, for example an endpoint on the provider network 190 or an endpoint external to the provider network 190. As indicated at 302 of FIG. 3A, the network processing device 110 may perform provider network packet processing 120 for the received packets to generate or modify header information for the packets. For example the provider network packet processing 120 may generate or modify header information to decapsulate incoming provider network packets targeted at a resource instance 140 on the host machine and encapsulate outgoing client packets received from a resource instance 140 on the host machine.

As indicated at 304 of FIG. 3A, the network processing device 110 may apply client network instance 140 processing to the received packets. A client network instance 140 may include any type of network packet processing functionality that the client wants or needs to apply to packets sent from and/or to the client's resource instances 180 on their private network implementation. Examples of network functionality that a client may implement for particular resource instances 180 or for an entire private network using client network instance(s) 140 may include, but are not limited to, firewalls, Wide Area Network (WAN) optimizers, Web application firewalls, or any of various type of network compliance functionality. In general, a client may configure a client network instance 140 to perform any type of analysis, modification, and/or filtering of IP packets and packet data that they want or need to apply to the IP packets coming from or going to their resource instances 180 on their private network implementation. Note that a client network instance 140 may modify packets, drop or filter packets, and/or duplicate packets according to the particular functionality implemented by the instance 140.

In some embodiments, provider network packet processing may be applied to the packets after the packets are processed by the client network instance 140, for example to check the packets to ensure that the packets comply with the provider network protocols and packet routing functionality, and to ensure that the client network instance 140 does not violate provider network security and isolation protocols that provide security for and isolation of client data and resource instances on the provider network.

As indicated at 306 of FIG. 3A, the network processing device may send the processed packets to a target endpoint. For example, the network processing device 110 may send encapsulated outgoing packets to an endpoint on the provider network 190 or an endpoint external to the provider network 190. As another example, the network processing device 110 may route decapsulated IP packets to a target resource instance or instances 140.

FIG. 3B illustrates a method for processing outgoing packets on a network processing device 110, according to some embodiments. As indicated at 350 of FIG. 3B, an outgoing client packet is loaded into memory on the host device. In some embodiments, transfers of packet data between client network instances 110 and client resource instances 180 on a host device may be performed via memory on the host device, for example using direct memory access (DMA) technology. For example, in some embodiments, the network processing device(s) 110 may be Peripheral Component Interconnect (PCI) device(s) plugged into PCI expansion slots or a PCI bus of the host device. In these embodiments, single root I/O virtualization (SR-IOV) technology provided by the PCI technology may be used for transfers of packet data between client network instances 110 and client resource instances 180 on the host device.

As indicated at 352 of FIG. 3B, the packet header is read from the memory by the network processing device 110. A resource instance 180 may load entire packets, including the packet header and client data, into the memory. However, the provider network packet processing 120 functionality and client network instance 140 may only need to add or modify header information for the packet. Thus, in some embodiments, only the header data may be read from the memory by network processing device 110.

As indicated at 354 of FIG. 3B, packet processing (e.g., provider network packet processing 120 functionality and client network instance 140) executes on the network processing device 110 to generate or modify the header information for the packet. As indicated at 356 of FIG. 3B, the header information is applied to the packet, for example by a network interface of the network processing device 110. As indicated at 356 of FIG. 3B, the packet is output from the memory to the provider network 190, for example by the network interface of the network processing device 110. In some embodiments, the output of the packet processing applied at 354 may be provided to the network interface of the network processing device 110. The network interface may read the respective packet from memory, for example using DMA, apply the header information generated by the packet processing functionality of the network processing device 110 to the packet, and output the modified packet to the provider network 190.

While FIG. 3B describes a method for processing outgoing packets from the resource instances 180 to the provider network 190, similar methods may be applied when processing incoming packets to the resource instances 180 from the provider network 190.

Embodiments of the methods and apparatus for providing network instances for resources in provider network environments as illustrated in FIGS. 1 through 3B may allow clients to implement packet processing functionality, for example proprietary or custom packet processing functionality, for packets going to and/or coming from resource instances in their client private networks in the provider network environment. Thus, using embodiments, packet processing functionality needed by a client that may not be supported or provided by the service provider's standard provider network and private network technology may be added to the client's resource instances and/or private network implementation by provisioning client network instance(s) 140 on the network processing device 110. Embodiments may also provide an interface (e.g., services and APIs) for developing, integrating, and managing client network instance(s) 140 for the virtualized resource instances 180 in the client's private network. Embodiments may also allow standard private network functionality provided via the private network control plane, for example security groups or other access control functions, to be modified, added to, or removed by the client for some or all resource instances in their private network, thus allowing clients to customize their private network implementations according to their particular needs.

The elements of FIGS. 1 through 3B are further described in reference to FIGS. 4 through 9, which illustrate methods and apparatus for establishing client network instances and processing packets at the client network instances in a provider network environment as illustrated in FIGS. 1 through 3B in more detail.

Figure 4A:
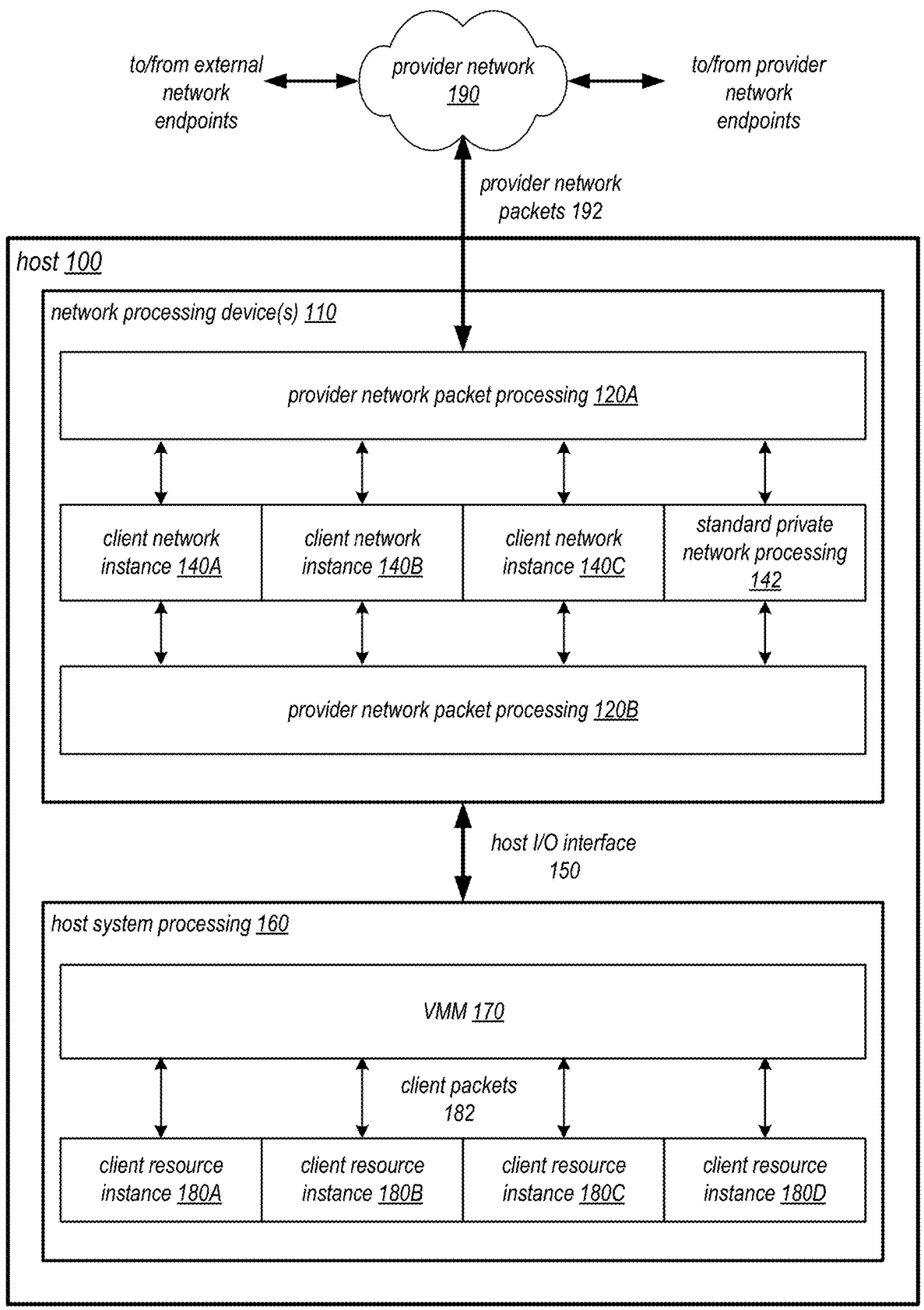
FIG. 4A illustrates client network instances processing packets for resource instances at network processing devices on a host device in a provider network environment, according to some embodiments.
Figure 5:
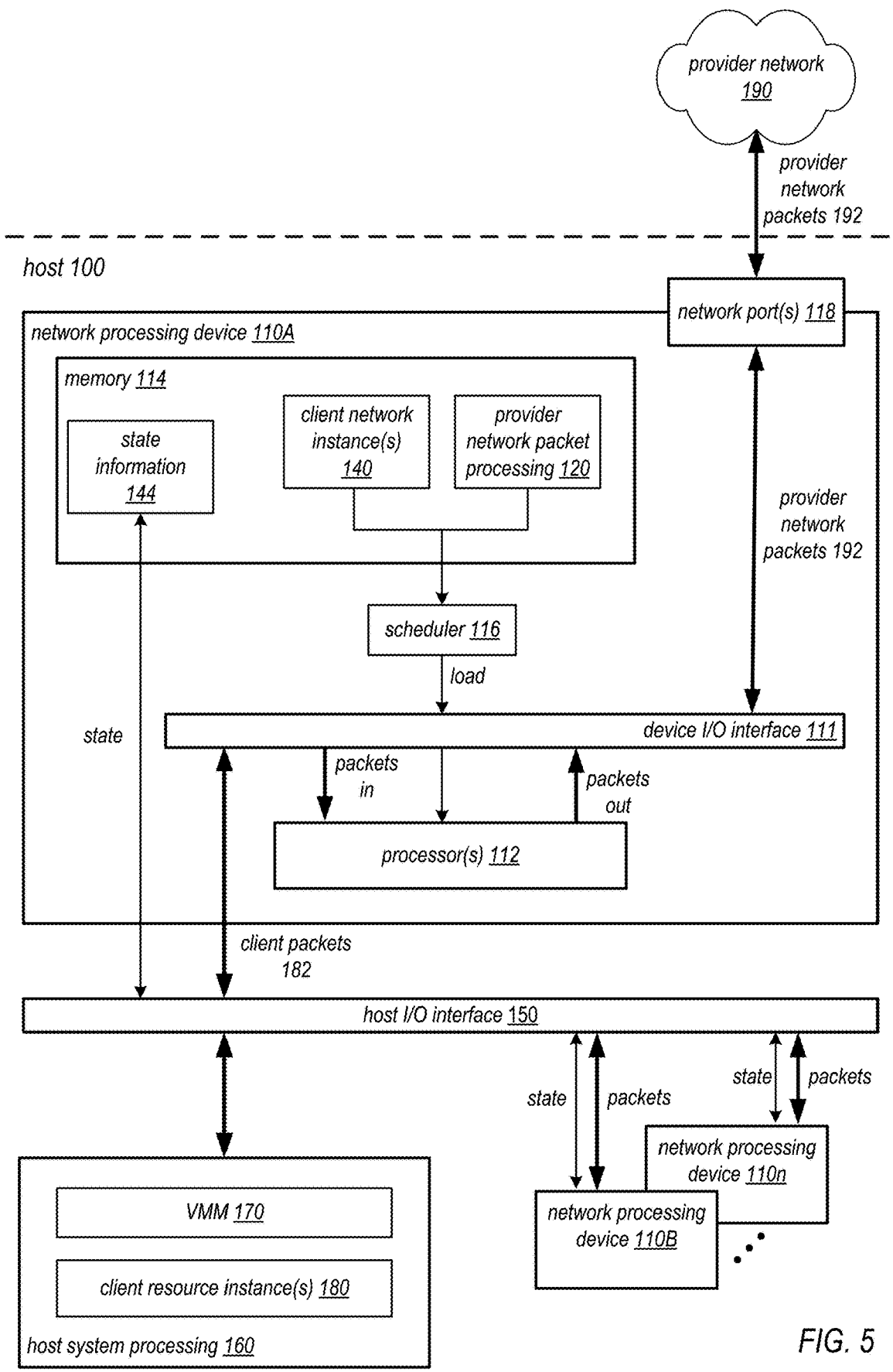
FIG. 5 illustrates an example network processing device that implements client network instances in a provider network environment, according to some embodiments.

FIG. 4A illustrates client network instances 140 processing packets for resource instances 180 at network processing devices 110 on a host device 100 in a provider network environment, according to some embodiments. Referring to FIG. 4A, in at least some embodiments of a provider network 190, at least some of the resources provided to clients of a service provider via the provider network 190 may be virtualized computing resources implemented on multi-tenant hardware that is shared with other client(s) and/or on hardware dedicated to the particular client. Each virtualized computing resource may be referred to as a resource instance 180. Resource instances 180 may, for example, be rented or leased to clients of the service provider. For example, referring to FIG. 9, clients of the service provider (represented in FIG. 9 by client network 870), via external client device(s) (e.g., console 872) coupled to the provider network 190 via an intermediate network such as the Internet, may access one or more services 806 of the provider network 190 via application programming interfaces (API(s)) 808 to the services 806 to obtain and configure resource instances 180, including but not limited to computation resources and storage resources.

Figure 15:
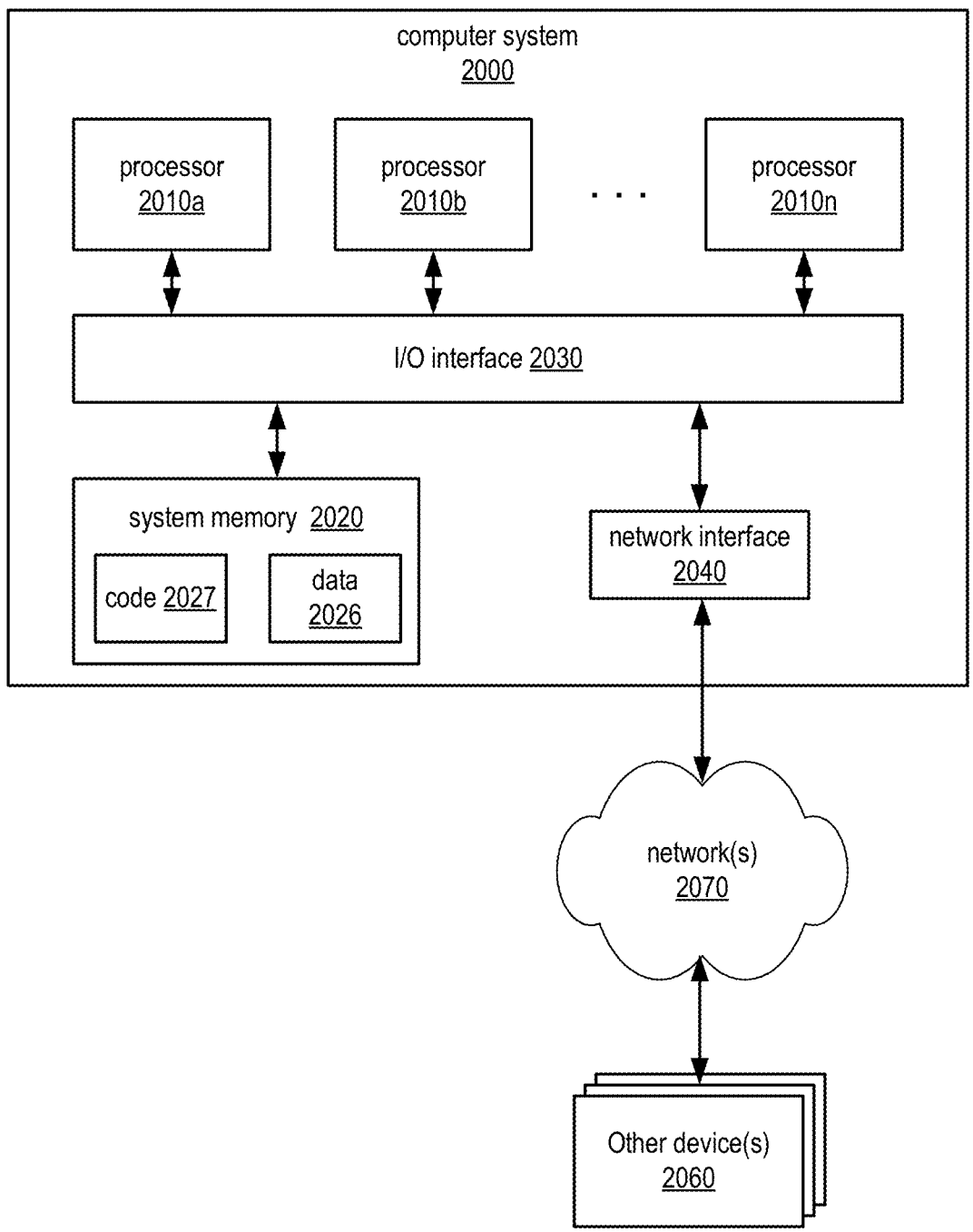
FIG. 15 is a block diagram illustrating an example computer system that may be used in some embodiments.

Referring to FIG. 4A, at least some of the resource instances 180 on the provider network 190 may be implemented according to hardware virtualization technology that enables multiple operating systems to run concurrently on a host computer 100, i.e. as virtual machines (VMs) on the host 100. A hypervisor, or virtual machine monitor (VMM) 170, on the host 100 presents the client resource instances 180 on the respective host 100 with a virtual platform and monitors the execution of the client resource instances 180 on the host 100. Each client resource instance 180 may be provided with one or more IP addresses; the VMM 170 may be aware of the IP addresses of the client resource instances 180 on the host 100, and may communicate with the network processing device(s) 110 on the host 100 to route incoming client packets 182 to and outgoing client packets 182 from the client resource instances 180. As shown in FIG. 4A, the VMM 170 and client resource instances 180 may be implemented on and executed by host device processing 160 components of the host 100, for example processor(s) and memory implemented by the host 100. For further information about hardware virtualization technology on a provider network, see FIG. 11. FIG. 15 is a block diagram illustrating an example computer system that may be used as a host 100 in some embodiments.

Referring to FIG. 4A, the provider network 190 may include a network substrate that includes networking devices such as routers, switches, network address translators (NATs), and so on, as well as the physical connections among the devices. In at least some embodiments, the VMMs 170, network processing devices 110, or other devices or processes on the network substrate may use encapsulation protocol technology to encapsulate and route network packets (e.g., client IP packets 182) over the network substrate between resource instances 180 on different hosts 100 within the provider network 190, or to endpoints external to the provider network 190 via network devices such as edge routers. The encapsulation protocol technology may be used on the network substrate to route encapsulated packets (also referred to as network substrate packets or provider network packets 192) between endpoints on the network substrate via overlay network paths or routes. The encapsulation protocol technology may be viewed as providing a virtual network topology overlaid on the network substrate. In at least some embodiments, the encapsulation protocol technology may include a mapping service that maintains a mapping directory that maps IP overlay addresses (public IP addresses) to substrate IP addresses (private IP addresses) and that may be accessed by various processes on the provider network 190 for routing packets between endpoints on the network substrate. For further information about a virtual network technology that uses an encapsulation protocol to implement an overlay network on a network substrate, see FIGS. 10 through 14.

Figure 13:
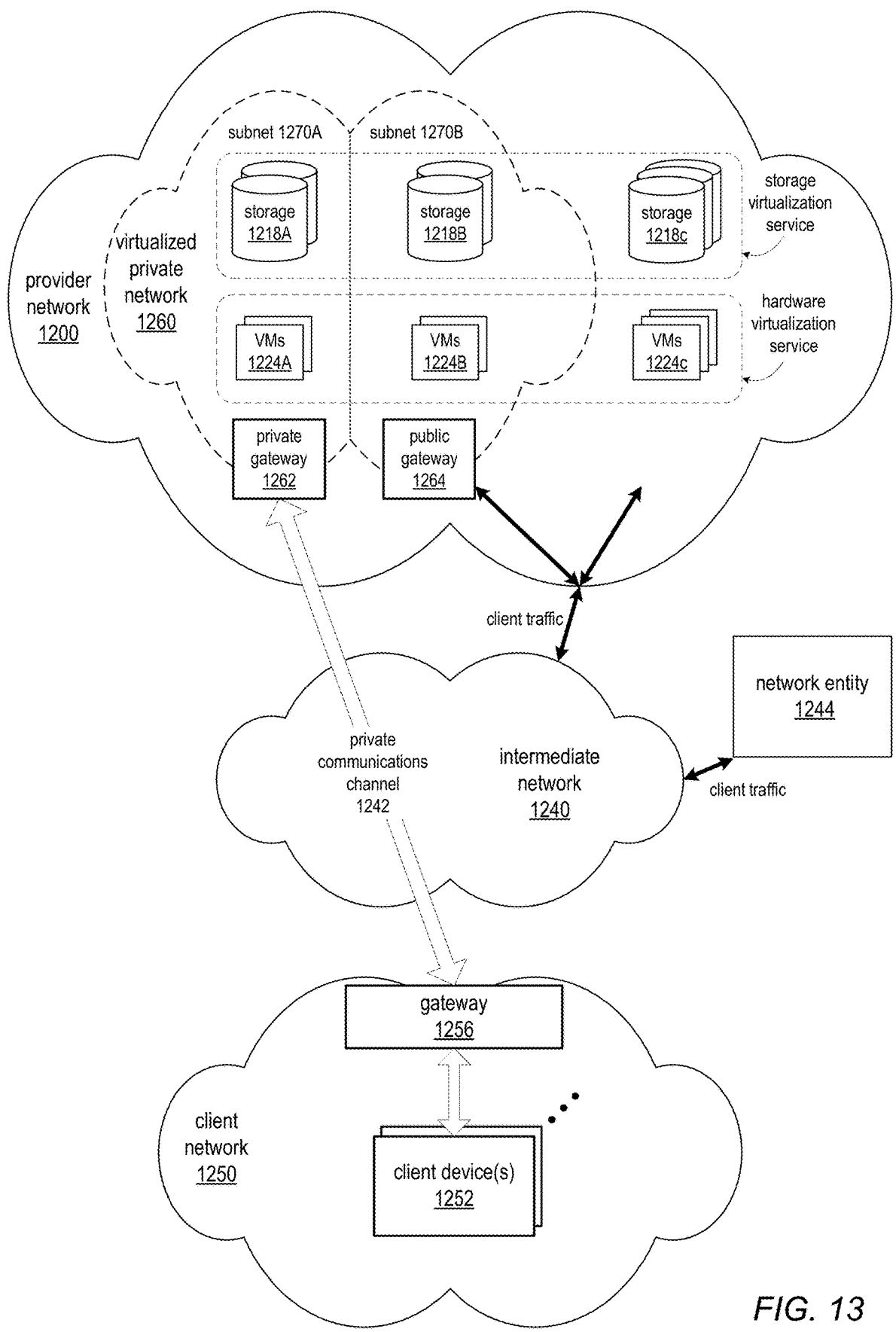
FIG. 13 illustrates an example provider network that provides virtualized private networks to at least some clients, according to at least some embodiments.
Figure 14:
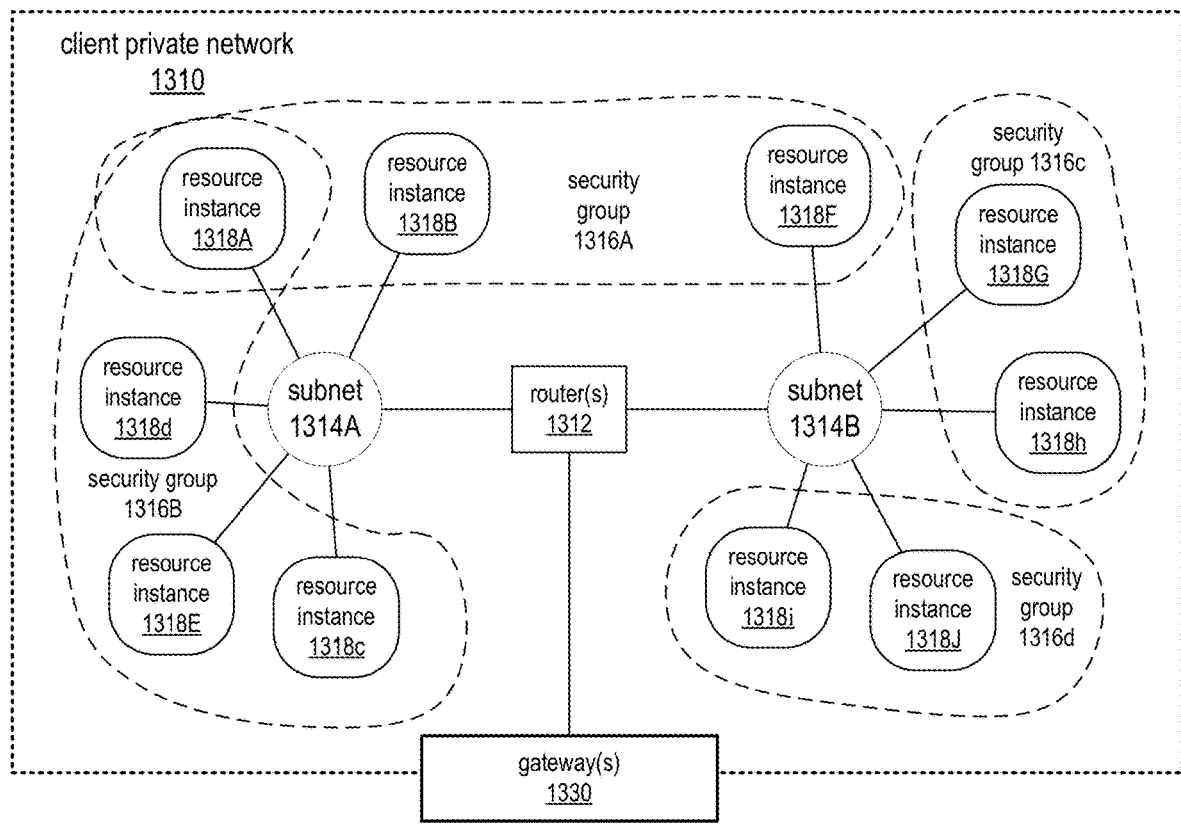
FIG. 14 illustrates subnets and security groups in an example virtual private network implementation on a provider network, according to at least some embodiments.

Referring to FIG. 9, a service provider may provide one or more provider network services 806 and one or more APIs 808 to the services 806 that allow clients to provision logically isolated sections of the provider network 190 in which the clients can launch their respective resource instances 180 in a client-defined virtual network on the provider network 190, referred to herein as a virtualized private network or client private network, or as simply a private network 810. Via the APIs 808, a client (represented in FIG. 9 by client network 870) may establish, configure, and manage a client private network 810 on provider network 190. The client may also establish and manage client private network access control and other functionality for the virtual networking environment of the client private network 810 via the API(s) 808 to the provider network service(s) 806. For example, the client may perform one or more of selecting IP address ranges, creating subnets and network ACLs, creating and managing security groups, and configuring route tables, network gateways, load balancers, routers, and other network functionalities to configure the client private network 810 and to control access to the client private network 810 and its resources 180. Via the API(s) 808, a client may customize the network configuration of their client private network 810. For example, as illustrated in FIG. 13, a client can create a public-facing subnet for web server resources that has access to the Internet, and may place backend system resources such as databases or application servers in a private-facing subnet with no Internet access. A client may leverage multiple layers of security, including but not limited to security groups and network ACLs, to control access to subnets and/or to resource instances in each subnet, for example as illustrated in FIG. 14.

Referring to FIG. 9, in some embodiments, a given client may establish one, two, or more separate private networks 810 on a provider network 190, and different clients may each establish private networks 810 on a provider network 190. In some embodiments, a client may specify an IP address space for each client private network 810 on the provider network 190. In some embodiments, the IP address spaces of two (or more) client private networks 810 may, but do not necessarily, overlap. Referring to FIG. 9, a client corresponding to client network 870 has established and provisioned a client private network 810 on provider network 190. Private network 810 has been provisioned with provider network resources 180 (e.g., virtual machines (VMs) on host devices 100 as illustrated in FIG. 4A configured as virtual computing resources by the client associated with client network 810). A private network 810 may include or implement access control and security rules and methods to control access to the private network 810 and to the resources 180 on the private network 810 by entities external to the private network 810.

Referring again to FIG. 4A, in at least some embodiments, a host 100 may include or may be coupled to one or more network processing devices 110 that process network traffic (e.g., packet flows) between the resource instances 180 on the host 100 and the provider network 190. As a non-limiting example, a network processing device 110 may be a PCI device plugged into a PCI expansion slot or PCI bus of the host 100.

A network processing device 110 may, for example, connect to a host I/O interface 150 (e.g., a PCI bus), and may receive client packets 182 from and send client packets 182 to client resource instances 180 executing as VMs on the host 100 via the host I/O interface 150.

A network processing device 110 may include provider network packet processing 120 functionality that may apply provider network-related functions to packets received by the device. For example, the provider network packet processing 120 functionality may implement provider network encapsulation protocol technology to encapsulate client packets 182 and route the encapsulated packets (provider network packets 190) over a network substrate within the provider network 190, and to decapsulate client packets 182 targeted at the resource instance(s) 180 on the host 100 and forward the decapsulated packets 182 to the target resource instance(s) 180. In addition, the network processing device 100 may include standard private network packet processing 142 functionality that may apply private network-related functions to at least some packets received by the device 110. For example, the private network packet processing 142 functionality may enforce security group, access control rules, access control lists (ACLs), subnets, and/or other access control functionality for clients' private network implementations on the provider network 190, for example as described in reference to FIGS. 13 and 14.

Conventionally, the private network packet processing 142 functionality implemented on the network processing device 110 applies a standard set of private network-related functions for all client private networks. As shown in FIG. 4A, clients may modify or replace the standard private network packet processing 142 functionality on a network processing device 110 with implementations of custom network functionality, referred to herein as client network instances 140. The client network instances 140 may be applied to packets for all resource instances 180 on the client's private network, or alternatively may be associated with and applied to packets for particular resources instances 180. In at least some embodiments, a client may specify and configure client network instances 140 for their client private network using the services and APIs that are used to configure and manage their virtual resource instances 180 on their client private network. In some embodiments, a client may develop and provide their own custom client network instance(s) 140. Alternatively, a service provider client, the service provider, and/or third-party developers may develop client network instances 140 and then offer the client network instances 140, for example through a client network instance 140 marketplace provided by the service provider, to other service provider clients for use with their client private networks.

As shown in FIG. 4A, in at least some embodiments, a network processing device 110 on a host 100 may include two or more client network instances 140A-140C, potentially with different client network instances 140 provided by two or more different provider network clients. In addition, in some embodiments, standard private network processing 142 may be applied for at least one client resource instance 180 supported by a network processing device 110.

As shown in FIG. 4A, in at least some embodiments, the client network instances 140 may be wrapped by the provider network packet processing 120 functionality of the network processing device 110 to provide isolation of and security for client data and resource instances on the provider network. As shown in FIG. 4A, in some embodiments, provider network packet processing 120A may process incoming provider network packets 192, for example to decapsulate the client network packets 182 before being processed by the client network instances 140 or the standard private network processing 142. In some embodiments, provider network packet processing 120B may process outgoing client packets 182, for example to encapsulate the client network packets 182 before being processed by the client network instances 140 or the standard private network processing 142. Alternatively, provider network packet processing 120A may encapsulate the packets 182 after the packets 182 are processed by the client network instances 140, and/or the provider network packet processing 120B may decapsulate the packets 182 after the packets 182 are processed by the client network instances 140. In some embodiments, provider network packet processing 120A may check the outgoing packets after the packets are processed by the client network instances 140 to ensure that the packets comply with the provider network encapsulation protocol and packet routing functionality. In some embodiments, provider network packet processing 120B may check the incoming packets after the packets are processed by the client network instances 140 to ensure that the packets comply with the packet addressing and routing functionality provided by the VMM 170.

Figure 4B:
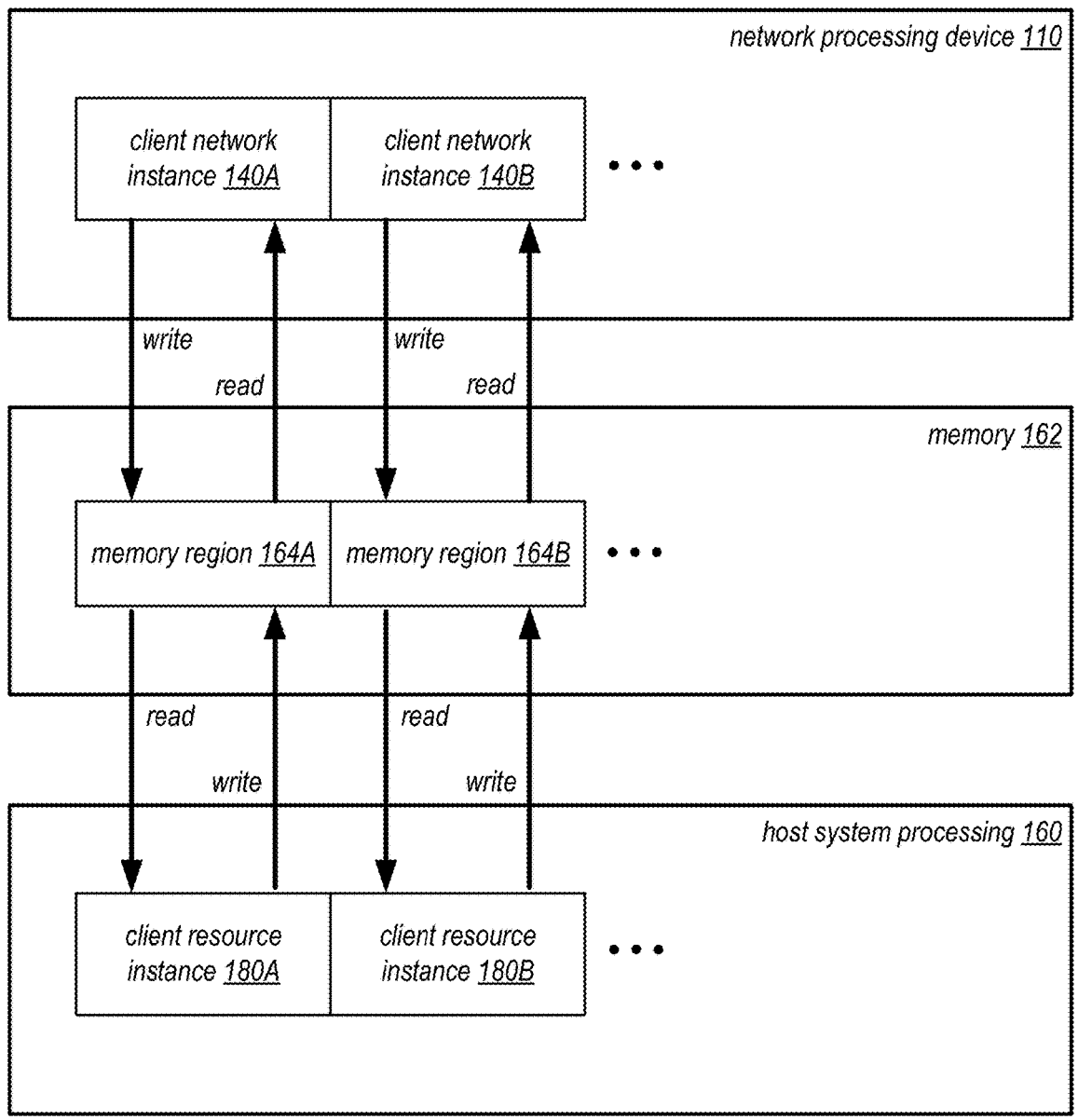
FIG. 4B illustrates transferring packet data between client network instances and client resource instances on a host device via memory on the host device, according to some embodiments.

FIG. 4B illustrates transferring packet data between client network instances 119 and client resource instances 180 on a host device 100 via memory 162 on the host device 100, according to some embodiments. In some embodiments, transfers of packet data between client network instances 110 and client resource instances 180 on a host device 100 may be performed via a memory 162 on the host device 100, for example using direct memory access (DMA) technology. For example, in some embodiments, the network processing device(s) 110 may be Peripheral Component Interconnect (PCI) device(s) plugged into PCI expansion slots or a PCI bus of the host device 100. In these embodiments, SR-IOV technology provided by the PCI technology may be used for transfers of packet data between client network instances 110 and client resource instances 180 on the host device 100, as shown in FIG. 4B.

In some embodiments, a memory region 164 may be allocated for or assigned to each client resource instance 180/client network instance 110 pair on the host device 100. For example, as shown in FIG. 4B, client resource instance 180A/client network instance 110A are allocated memory region 164A, and client resource instance 180B/client network instance 110B are allocated memory region 164. In some embodiments, security and isolation protocols may be applied to the client network instances 110 to provide security for and isolation of client data and resource instances on the provider network. For example, in some embodiments, the network processing device 110 may ensure that the client network instances 140A and 140B do not violate provider network security and isolation protocols that provide security for and isolation of client data and resource instances on the provider network. For example, functionality implemented by the network processing device 110 may ensure that the client network instances 140A and 140B only access and do not read from or write to memory outside their respective allocated regions 164A and 164B. Similarly, functionality implemented by host system processing 160 may ensure that the client resource instances 180A and 180B only access and do not read from or write to memory outside their respective allocated regions 164A and 164B.

A resource instance 180 may load entire packets, including the packet header and client data, into the memory 162. However, the provider network packet processing 120 functionality and respective client network instance 140 may only need to add or modify header information for the packet. Thus, in some embodiments, only the header data may be read from the memory 162 by the network processing device 110. Packet processing (provider network packet processing 120 functionality and client network instance 140) executes on the network processing device 110 to generate or modify the header information for the packet. The new or modified header information may then be written to the memory 162.

While not shown in FIG. 4B, in some embodiments, other components of the host system 100 may read and/or write packet data to the memory 162. For example, in some embodiments, a network interface of the network processing device 110 may read packet headers and data from the memory 162 for output onto the provider network 100 as described in reference to FIG. 3B, and may also write incoming packet headers and data to the memory 162.

FIG. 5 illustrates an example network processing device 110A on a host 100 that implements client network instance(s) 140 in a provider network environment, according to some embodiments. In at least some embodiments, a VMM 170 on the host 100 presents client resource instances 180 on the respective host 100 with a virtual platform and monitors the execution of the client resource instances 180 on the host 100. The VMM 170 and client resource instances 180 may be implemented on and executed by host device processing 160 components of the host 100, for example processor(s) and memory implemented by the host 100.

In at least some embodiments, a host 100 may include or may be coupled to one or more network processing devices 110A-110n that process network traffic (e.g., packet flows) between the resource instances 180 on the host 100 and the provider network 190. Each network processing device 110A-110n may, for example, connect to a host I/O interface 150 (e.g., a PCI bus), and may receive client packets 182 from and send client packets 182 to client resource instances 180 executing as VMs on the host 100 via the host I/O interface 150. As a non-limiting example, a network processing device 110A may be a Peripheral Component Interconnect (PCI) device plugged into a PCI expansion slot or PCI bus of the host 100. A network processing device 110A may include one or more network ports 118 connected to the provider network 190, and may receive provider network packets 192 from and send provider network packets 192 onto the provider network 190 via the port(s) 118. A network processing device 110A may also include, but is not limited to, one or more processors 112 (e.g., multicore processor(s)), a memory 114, and an internal I/O bus or interface 111. The processor(s) 112 may be custom or proprietary processors, or alternatively may be general-purpose processors.

A network processing device 110A may include provider network packet processing 120 functionality, for example as executable code stored in memory 114, that may be executed by the processor(s) 112 to apply provider network-related functions to packets received by the network processing device 110A. For example, the provider network packet processing 120 functionality may implement provider network encapsulation protocol technology to encapsulate and route IP packets over a network substrate within the provider network 190, and to decapsulate IP packets targeted at the resource instance(s) 180 on the host 100 and forward the decapsulated IP packets to the target resource instance(s) 180. In addition, the network processing device may include standard private network packet processing functionality that may apply private network-related functions of the provider network to at least some packets received by the network processing device 110A.

In at least some embodiments, clients may specify or provide client network instance(s) 140 when provisioning new resource instances 180 in their private network implementation, or may specify or provide client network instance(s) 140 for existing resource instances 180 in their private network implementation to replace the standard private network packet processing functionality that may be provided by the network processing device 110A. For example the client network instance(s) 140 may be stored in memory 114 as code that may be executed by the processor(s) 112. In at least some embodiments, a client may specify or provide a client network instance 140 for a resource instance 180 using the service provider's services and APIs that are used to configure and manage their virtual resource instances 180 on their client private network.

After a client network instance 140 is instantiated on a network processing device 110A, the network processing device 110A applies the functionality of the client network instance 140 to packets being processed through the network processing device 110 to and from a respective resource instance 180 or instances instead of the standard private network packet processing. In at least some embodiments, the provider network packet processing 120 functionality is applied to the packets to ensure that the packets conform to the provider network's encapsulation protocol and packet routing technology.

Figure 6:
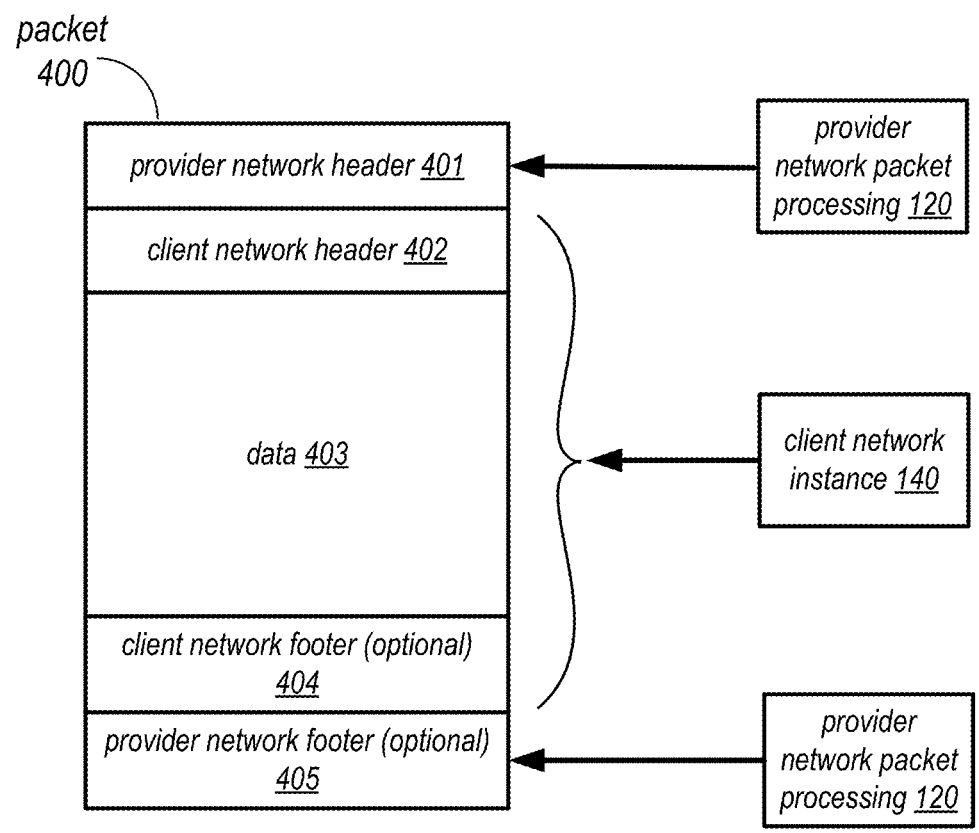
FIG. 6 illustrates an example packet that may be processed by provider network packet processing and a client network instance on a network processing device in a provider network environment, according to some embodiments.

FIG. 6 illustrates an example packet 400 that may be processed by provider network packet processing 120 and a client network instance 140 on a network processing device 110 in a provider network environment, according to some embodiments. As shown in FIG. 6, a packet 400 may include provider network metadata (e.g., a provider network header 401 and optional provider network footer 405), client network metadata (e.g., a client network header 402 and optional client network footer 404), and client data 403. As shown in FIG. 6, the provider network packet processing 120 may add, remove, or modify the provider network metadata. The client network instance 140 may add, remove, or modify the client network metadata. In at least some embodiments, the client network instance 140 may be wrapped by the provider network packet processing 120 functionality, for example to ensure compliance with provider network protocols, for example the provider network encapsulation protocol and packet routing protocols. In some embodiments, provider network packet processing 120 may check outgoing packets after the packets are processed by the client network instance 140 to ensure that the packets comply with the provider network encapsulation protocol and packet routing functionality. In some embodiments, provider network packet processing 120B may check incoming packets after the packets are processed by the client network instance 140 to ensure that the packets comply with the packet addressing and routing functionality provided by the VMM 170. In at least some embodiments, a client network instance 140 corresponding to a resource instance 180 may be prevented from tampering with packets or packet metadata for the packets directed to other resource instances of the same client and/or resource instances of other clients on the respective host device 100. FIGS. 8A and 8B illustrate example methods for generating and instantiating client network instances 140 that provide isolation of and security for client data and resource instances on a host device 100.

Figure 7:
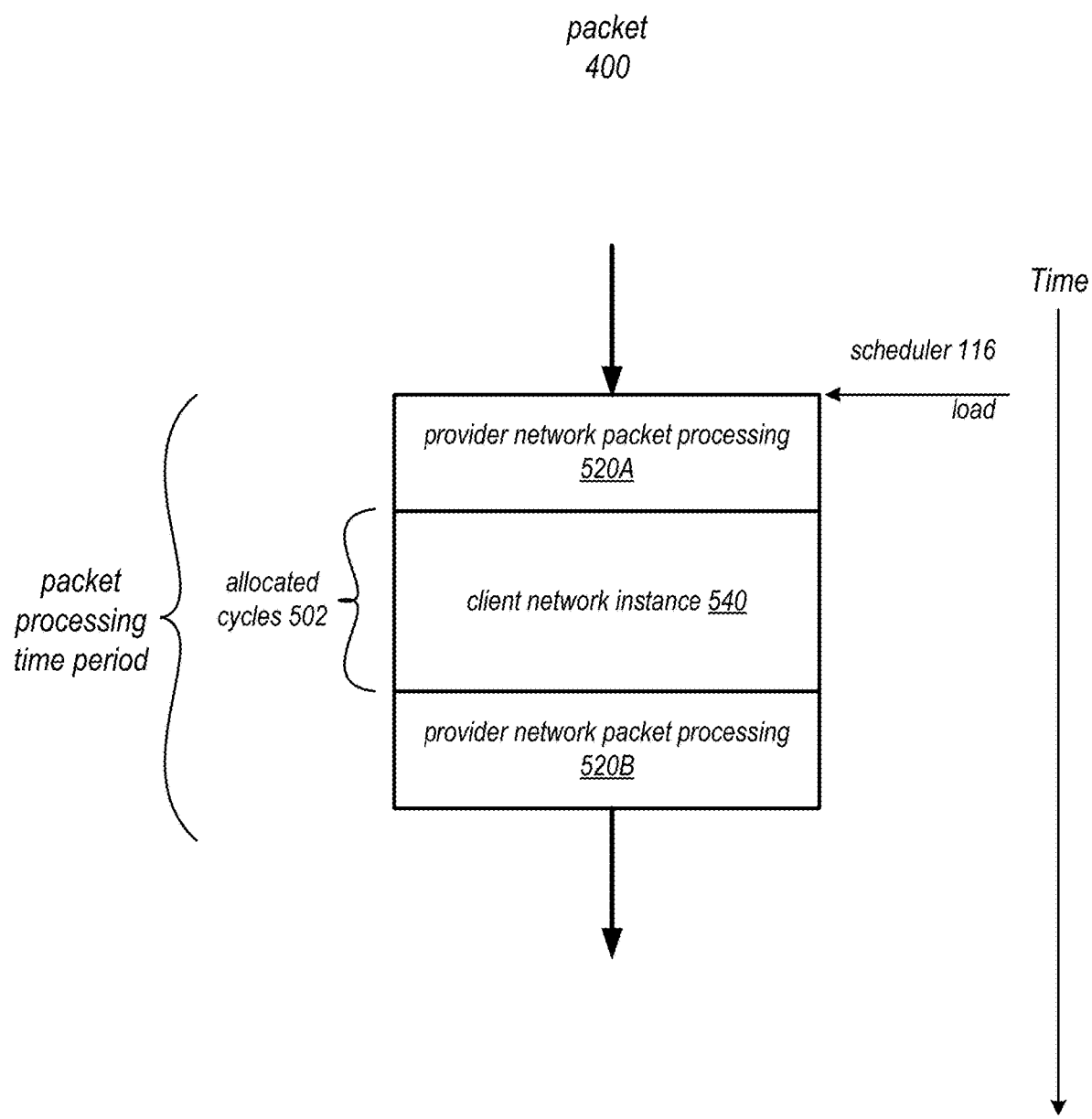
FIG. 7 illustrates packet processing on a network processing device that includes client network instances, according to some embodiments.

FIG. 7 illustrates packet processing and processor cycle allocation on a network processing device 110 that includes client network instances 140, according to some embodiments. Referring to FIG. 5, in some embodiments, a network processing device 110A, or each processor 112 on a network processing device 110A, may have a number of processor cycles per time period (e.g., per second) for processing packets 400, or alternatively a number of processor cycles per packet 400. In at least some embodiments, the processor cycles may be divided among provider network packet processing 120 and one or more client network instances 140 that may be processing packets 400 on the network processing device 110A or processor 112. In at least some embodiments, provider network packet processing 120 takes precedence, and the remainder of the processor cycles are allocated to the client network instance(s) 140 on the network processing device 110.

As shown in FIG. 5, a network processing device 110A may include a scheduler 116 component that manages allocation of processor 112 usage to provider network packet processing 120 and the client network instance(s) 140. In some embodiments, the scheduler 116 may be a software program or module stored in memory 114 and executed by the processor(s) 112. In some embodiments, the scheduler 116 may allocate a certain number of cycles per packet 400 to each client network instance 140. Alternatively, the scheduler 116 may allocate a certain number of processor cycles per time period (e.g., second) to each client network instance 140, or a certain amount of time for processing each packet to each client network instance.

As shown in FIG. 7, in some embodiments, a scheduler 116 component on a network processing device 110 may manage loading and unloading provider network packet processing 520A and/or provider network packet processing 520B and a client network instance 540 for execution by the processor(s) 112 according to the processor cycle or time allocation for the instance 540. For example, if a client network instance 540 is taking longer than its allocated number of processor cycles 502 or time to process a packet 400, the scheduler 116 may stop the client network instance 540. In some embodiments, a developer of a client network instance 540 may know at least approximately the number of processor cycles per second and/or per packet 400 that the instance 540 will be allocated, and may thus configure the client network instance 540 to process packets 400 at a desired packet rate per second according to the allocated number of processor cycles. In some embodiment, a token-based system may instead be used in which each client network instance 540 is given some number of tokens that the client network instance 540 can use to obtain processing time during a specified time period, for example N tokens per second.

As shown in FIG. 7, in some embodiments, provider network packet processing 520A may process packets 400, for example to encapsulate or decapsulate client network packets before the packets 400 are processed by the client network instance 540. In some embodiments, provider network packet processing 520B may process packets 400 after the packets 400 are processed by the client network instance 540, for example to check the packets 400 after the packets are processed by the client network instance 540 to ensure that the packets 400 comply with the provider network protocols and packet routing functionality, and to ensure that the client network instance 540 does not violate provider network security and isolation protocols that provide security for and isolation of client data and resource instances on the provider network.

In some embodiments, scheduler 116 may load each software module (provider network packet processing 520A, client network instance 540, and provider network packet processing 520B) into the processor(s) for execution. Alternatively, an optimization may be performed in which the modules are compiled together to form one software module that is loaded and executed in the processor(s) as a unit.

Referring to FIG. 5, a host 100 may include multiple network processing devices 110A-110n. In some embodiments, a client's network instances 140 may be instantiated on two or more of the network processing devices 110. This may allow a client to design and implement larger capacity pools on a single host 100. For example, if each network processing device 110 supports 10 gigabit per second throughput, a client may configured ten network processing devices 110 with client network instances 140 to provide 100 gigabit per second throughput to their private network resources 180 on the host 100. As shown in FIG. 5, some applications or network functionality implemented by the client network instances 140 (e.g., network address translation (NAT)) may maintain and share state information 144 across the instances 140. This state information may be shared between the instances 140 on the devices 110 via the host I/O interface 150, e.g. via a memory or PCI bus. Thus, in some embodiments, a client may utilize network instances 140 on multiple network processing devices 110 on a host, and may share state 144 among the network instances 140 via a PCI/memory bus of the host 100, thus allowing the client to implement functionality such as NAT across a large capacity pool that requires a shared state.

FIGS. 8A and 8B illustrate methods for generating and instantiating client network instances that maintain isolation of and security for client data and resource instances on the provider network, according to some embodiments. Network instances as described herein may be provided for and associated with resource instances on a provider network to provide custom network functionality for the resource instances. A network instance may be developed by a client of the provider network or by third parties, and may replace, modify, or supplement at least part of the provider network packet processing functionality provided by the service provider. The provider network packet processing functionality provides isolation of and security for client data and resource instances on the provider network. Thus, methods for generating and instantiating client network instances may be provided that ensure that the network instances maintain isolation of and security for client data and resource instances on the provider network when installed and executed on network processing devices of host devices in the provider network. FIGS. 6A and 6B illustrate example methods for generating and instantiating client network instances while maintaining isolation and security for client data and resource instances. These methods may be used alone or in combination. Further, these methods are not intended to be limiting; other methods may be applied to network instance development and instantiation to maintain isolation and security for client data and resource instances.

FIG. 8A illustrates a method for generating and instantiating a client network instance in which the network processing device on which the network instance is instantiated enforces isolation of and security for client data and resource instances on the host device, according to some embodiments. In this method, virtualization technology of the network processing device may implement a virtualization environment on the device that provides hypervisor-based security and isolation for client network instances on the network processing device. In some embodiments, processors on the network processing device provide hardware-assisted virtualization technology, and thus the network instances on the network processing device may be "sandboxed" according to the virtualization technology, for example using privileged instructions and hypervisor-managed page tables. In some embodiments, provider network packet processing functionality provided by the service provider may execute before and after a client network instance when processing packets to ensure that the client network instance does not violate provider network security and isolation protocols that provide security for and isolation of client data and resource instances on the provider network. As indicated at 600 of FIG. 6A, a client provides a network instance. The client may have developed the network instance themselves, or alternatively the client may have obtained a network instance that was developed by another entity. As indicated at 602 of FIG. 6A, the client network instance is instantiated in a virtualization environment on a network processing device on a host device. The client network instance may be associated with a client resource instance on the same host device. As indicated at 604 of FIG. 6A, the client network instance executes within the virtualization environment on the network processing device to process outgoing and/or incoming packets. As indicated at 606 of FIG. 6A, provider network code executes within the virtualization environment to ensure that the client network instance complies with security and isolation protocols of the provider network when processing the packets.

FIG. 8B illustrates a method for generating and instantiating a client network instance in which the service provider provides a domain-specific programming language and APIs to clients according to which the clients develop their custom client network instance, according to some embodiments. In this method, a client develops custom code for their client network instance according to the domain-specific programming language and APIs and provides the code to the service provider, for example via an API to a provider network service; the service provider then compiles and verifies the code to ensure that the client network instance does not violate provider network security and isolation protocols that provide security for and isolation of client data and resource instances on the provider network. For example, the client's code may be checked to ensure that the code does not access memory outside of its memory region as illustrated in FIG. 4B. The checked and compiled code may then be instantiated on network processing device(s). In some embodiments, provider network code may execute before and after the client network instance on the network processing device to ensure that the client network instance does not violate provider network security and isolation protocols during execution.

As indicated at 620 of FIG. 6B, a client develops network instance code according to the domain-specific language and APIs for developing network instances provided by the service provider. As indicated at 622 of FIG. 6B, the client uploads the network instance code to the provider network, for example via an API to a provider network service. As indicated at 624 of FIG. 6B, the network instance code is verified and compiled on the provider network to generate a client network instance. As indicated at 626 of FIG. 6B, the client network instance is instantiated on a network processing device on a host device. The client network instance may be associated with a client resource instance on the same host device. As indicated at 628 of FIG. 6B, the client network instance executes within the virtualization environment on the network processing device to process outgoing and/or incoming packets. As indicated at 630 of FIG. 6B, provider network code may execute within the virtualization environment to ensure that the client network instance complies with security and isolation protocols of the provider network when processing the packets.

Figure 8C:
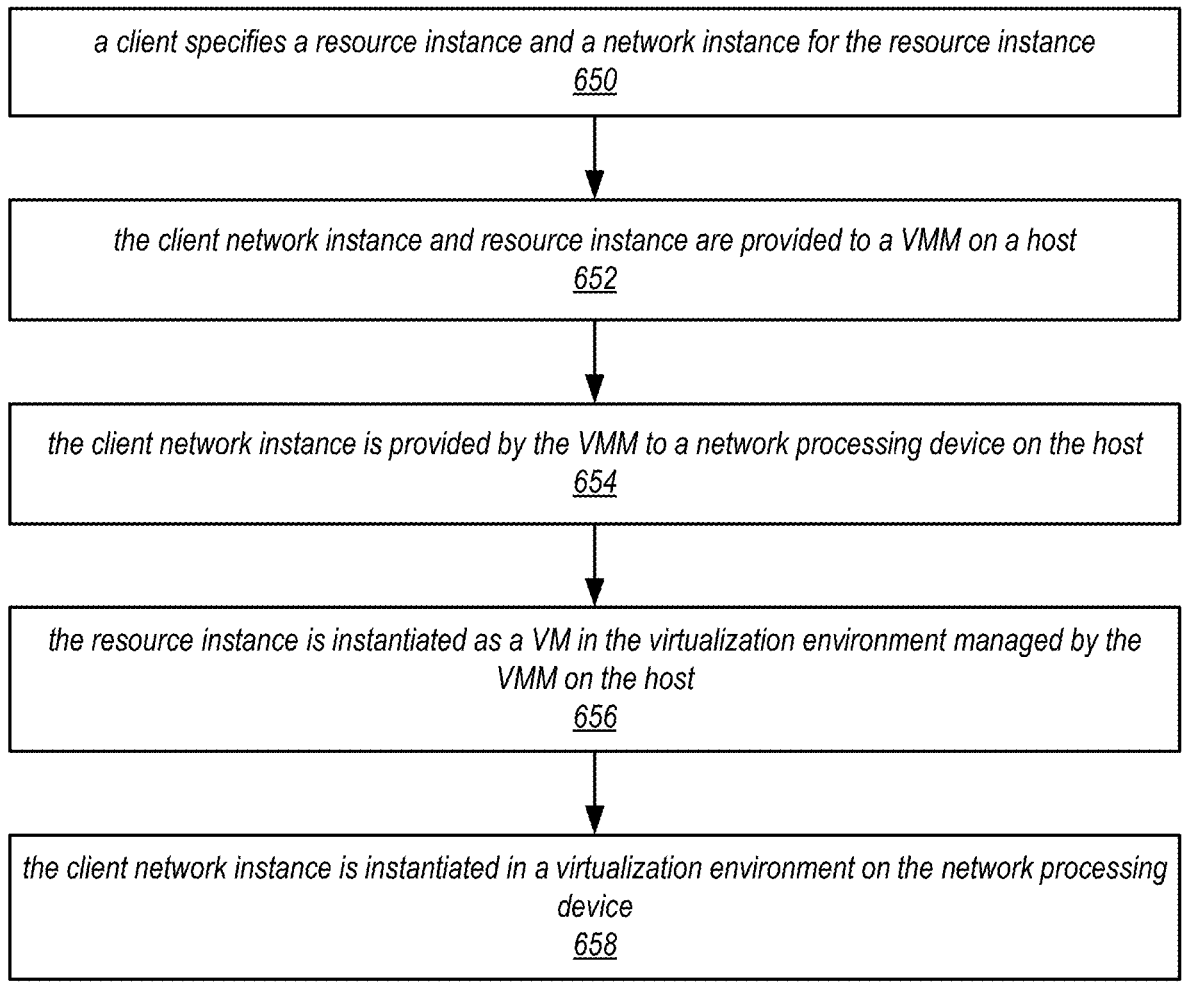
FIG. 8C illustrates a method for instantiating resource instances and network instances for a client on a host device, according to some embodiments.
Figure 9:
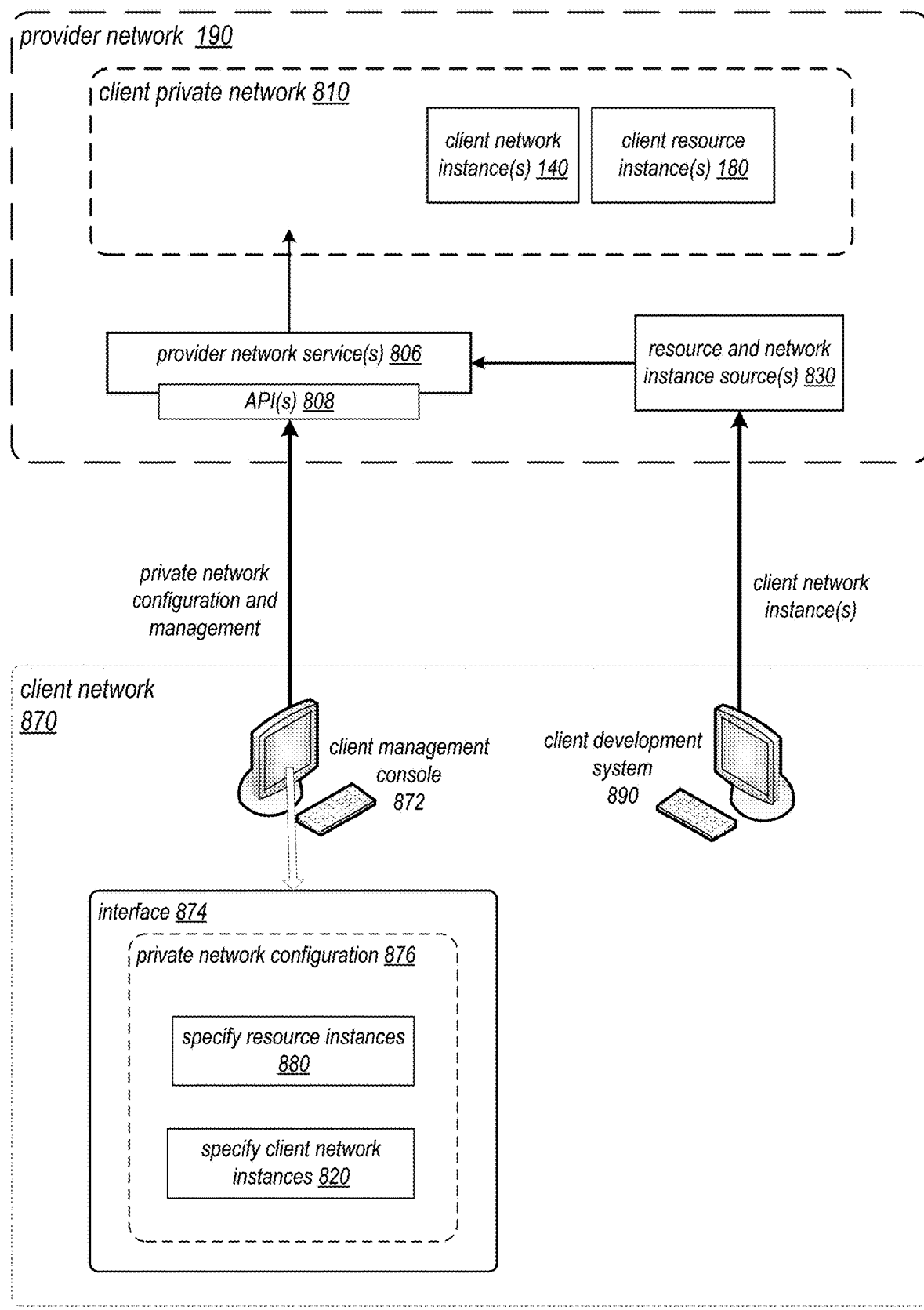
FIG. 9 illustrates provider network services and application programming interfaces (APIs) that may be used to establish client resource instances and network instances on a private network in a provider network environment, according to at least some embodiments.

FIG. 8C illustrates a method for installing resource instances and network instances for a client on a host device, according to some embodiments. A network processing device on a host may include standard provider network packet processing functionality that may apply standard provider network-related functions for resource instances on the host. In embodiments, clients may modify or replace at least part of the standard network packet processing functionality on the network processing device with client network instances that are associated with client resource instances on the host. FIG. 8C illustrates an example method for installing resource instances and network instances for a client on a host device that may be used in some embodiments. Note that the method of FIG. 8C is not intended to be limiting; other methods may be used to install resource instances and network instances for a client on a host device. The method of FIG. 8C may, for example, be used with one or both of the methods as illustrated in FIGS. 8A and 8B to instantiate a client's network instance and associated resource instance on a host device.

As indicated at 650 of FIG. 6C, a client specifies a resource instance and a network instance for the resource instance. A client may provide, select, or specify a client resource instance and a client network instance for use on the provider network, for example as illustrated in FIG. 9. As indicated at 652 of FIG. 6C, the client network instance and resource instance may be provided to a VMM on a host device, for example as illustrated in FIGS. 3A and 5. As indicated at 654 of FIG. 6C, the client network instance is provided by the VMM to a network processing device on the host, for example as illustrated in FIGS. 3A and 5. As indicated at 656 of FIG. 6C, the resource instance is instantiated as a VM in the virtualization environment managed by the VMM on the host. As indicated at 658 of FIG. 6C, the client network instance is instantiated in a virtualization environment on the network processing device, for example as described in reference to FIG. 8A.

FIG. 9 illustrates provider network services and application programming interfaces (APIs) that may be used to establish 1 s 180 and client network instances 140 on a private network 810 in a provider network environment, according to at least some embodiments. In some embodiments, a service provider may provide one or more private network services 806 and one or more application programming interfaces (API(s)) 808 to the services 806 that allow clients (e.g., a private network manager using a management console 872 on a client network 870) to provision, configure, manage, and view client private networks 810, including the resource instances 180 and client network instances 140 as described herein. For example, in some embodiments, a private network manager may establish and manage private network access control, including but not limited access control rules and security groups as shown in FIG. 14, via the private network services. The APIs 808 and services 806 may allow the manager to establish access control rules for the private network 810, include resource(s) 180 in security groups, and otherwise configure, view, and manage the private network 810. In at least some embodiments, the service provider that provides the provider network 190 may charge clients for resource usage (e.g., computation and storage resource usage), bandwidth usage, and other types of network usage on the private network 810.

In at least some embodiments, the provider network service(s) 806 and APIs 808 may be used to implement client network instances 140 for resource instances 180 in provider network environments as illustrated in FIGS. 1 through 8C. A client associated with client network 870 may, for example, establish, provision, and manage a private network 810 on provider network 190 via one or more services 806 of the provider network 190 accessed through a management console 872 on client network 870. For example, the client may access API(s) 808 of one or more services 806 via the management console 872 to implement resource instances 180 in the client private network 810, and to implement client network instances 140 for the resource instances 180, as described in reference to FIGS. 1 through 8C. In at least some embodiments, the API(s) 808 may display an interface 874 on console 872 that provides one or more graphical and/or textual interface elements that allow the client to view, create, provision, and manage the client's private network configuration 876 including the client's resource instances 180 and associated client network instances 140.

FIG. 9 shows a non-limiting example of a graphical and/or textual interface 874 that may be displayed on a client's console 872. The interface 874 may, for example, show a graphical and/or textual representation of the topology of private network 810. Graphical and/or textual representations of one or more resources 180 and client network instances 120 in the private network 810 may be displayed. Graphical and/or textual representations of network elements, security and access control components or elements (e.g., security groups and subnets as illustrated in FIGS. 14 and 15), and other private network components may also be displayed. Graphical and/or textual representations of private network access control components for the resources 180 may also be displayed.

The client may, for example, use a cursor control device to select various interface elements provided by interface 874 to, for example, create and provision client private network 810, create, manage, and modify private network access control for the private network 810 and for resources 180 within the private network 810, and to perform other private network functionality such as the creation and management of security groups. The interface 874 may include other user interface elements, for example menus or other elements that allow the client to select from among various ones of the client's private networks, elements to select, create, configure, and manage resources 180 within private networks, elements for associating client network instances 140 with resources 180 in the private network 810, and so on.

In some embodiments, the interface 874 may include one or more user interface elements 880 via which the client may specify or select resource instances 180, and one or more user interface elements 820 via which the client may specify or select client network instances 140 for the resource instances 180. For example, in some embodiments, when creating a new resource instance 180 or selecting a resource instance 180 from a source 830, the client may be allowed to specify a client network instance 140 to be associated with the resource instance 180, for example from a network instance source 830. For example, a service provider client, the service provider, and/or third-party developers may develop client network instances 140 and then offer the client network instances 140 through a source 830, for example through a network instance marketplace provided by the service provider, to other service provider clients for use with their client private networks. In some embodiments, a client network instance 140 may be designed to work with a particular type of resource instance 180, and the interface 874 may include one or more user interface elements via which the client may specify a client network instance 140/resource instance 180 pair.

In some embodiments, as an alternative to selecting a client network instance 140 from a source 830, a client network instance 140 may be software code developed and provided by the client. In some embodiments, the code may be written by the client according to specifications and/or development tools provided by the service provider.

In some embodiments, the client may compile the code and provide an executable to the service provider for installation on network processing device(s) that service the client's resource instance(s) 180. Alternatively, the client may provide the code to the service provider, and the service provider may compile the code for installation on the network processing device(s).

In some embodiments, instead of or in addition to providing a graphical interface via console 872, a provider network 190 may provide a command line interface (CLI) to the private network services 806 via which the client may manage their private network 810. For example, in some embodiments, the client may create and provision private networks via CLI commands, create, manage, and modify access control rules for the private network 810 and for resources 180 within the private network 810 via CLI commands, and integrate and manage and client network instances 140 for resources 180 within the private network 810 via CLI commands.

Example Provider Network Environments

This section describes example provider network environments in which embodiments of the methods and apparatus for providing network instances for resources in provider network environments as described in reference to FIGS. 1 through 10 may be implemented. However, these example provider network environments are not intended to be limiting.

Figure 10:
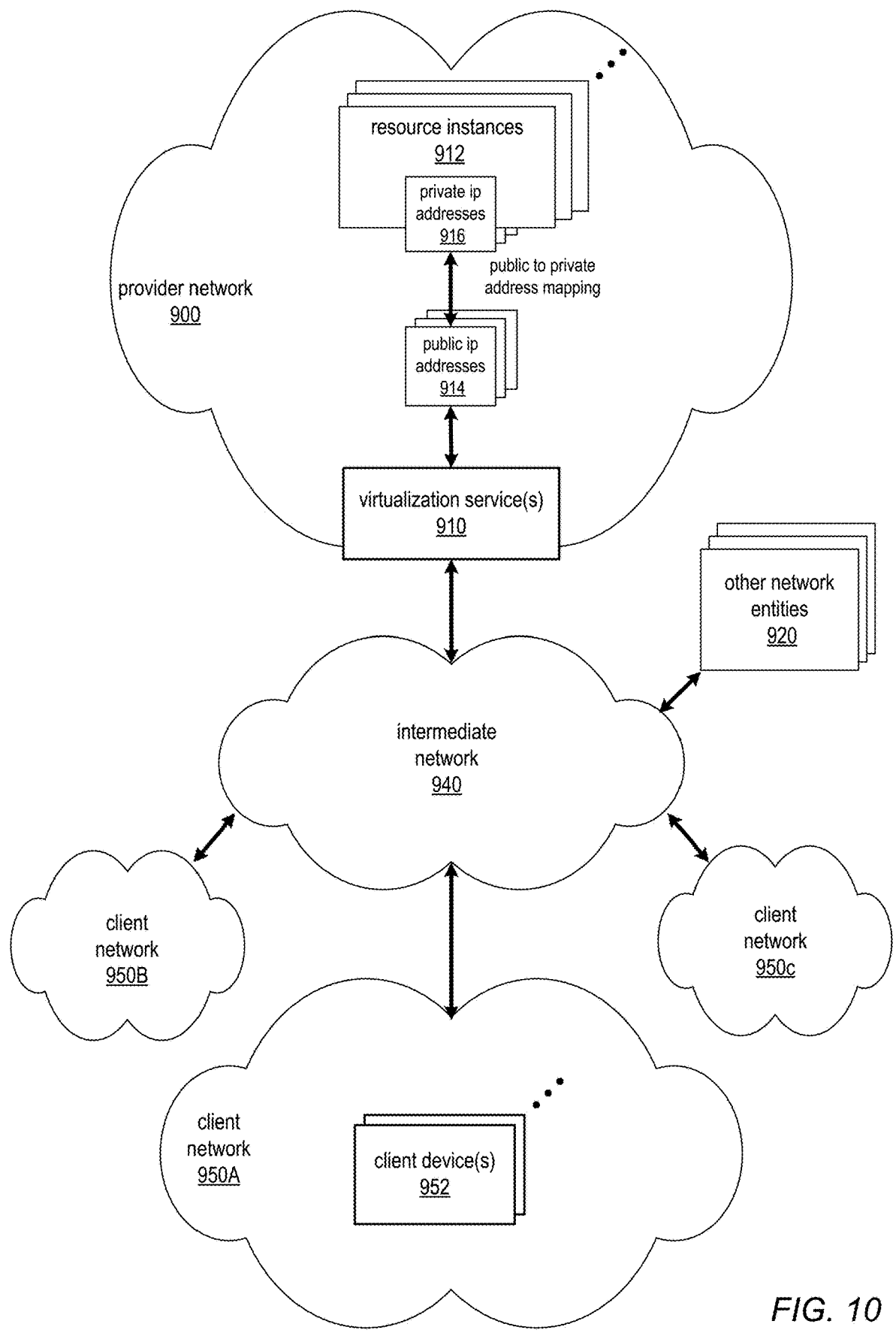
FIG. 10 illustrates an example provider network environment, according to at least some embodiments.

FIG. 10 illustrates an example provider network environment, according to at least some embodiments. A provider network 900 may provide resource virtualization to clients via one or more virtualization services 910 that allow clients to purchase, rent, or otherwise obtain instances 912 of virtualized resources, including but not limited to computation and storage resources, implemented on devices within the provider network or networks in one or more data centers. Private IP addresses 916 may be associated with the resource instances 912; the private IP addresses are the internal network addresses of the resource instances 912 on the provider network 900. In some embodiments, the provider network 900 may also provide public IP addresses 914 and/or public IP address ranges (e.g., Internet Protocol version 4 (IPv4) or Internet Protocol version 6 (IPv6) addresses) that clients may obtain from the provider 900.

Conventionally, the provider network 900, via the virtualization services 910, may allow a client of the service provider (e.g., a client that operates client network 950A) to dynamically associate at least some public IP addresses 914 assigned or allocated to the client with particular resource instances 912 assigned to the client. The provider network 900 may also allow the client to remap a public IP address 914, previously mapped to one virtualized computing resource instance 912 allocated to the client, to another virtualized computing resource instance 912 that is also allocated to the client. Using the virtualized computing resource instances 912 and public IP addresses 914 provided by the service provider, a client of the service provider such as the operator of client network 950A may, for example, implement client-specific applications and present the client's applications on an intermediate network 940, such as the Internet. Other network entities 920 on the intermediate network 940 may then generate traffic to a destination public IP address 914 published by the client network 950A; the traffic is routed to the service provider data center, and at the data center is routed, via a network substrate, to the private IP address 916 of the virtualized computing resource instance 912 currently mapped to the destination public IP address 914. Similarly, response traffic from the virtualized computing resource instance 912 may be routed via the network substrate back onto the intermediate network 940 to the source entity 920.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include network devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In at least some embodiments, the mapping of a standard IP address to a private IP address of a resource instance is the default launch configuration for all resource instance types.

At least some public IP addresses may be allocated to or obtained by clients of the provider network 900; a client may then assign their allocated public IP addresses to particular resource instances allocated to the client. These public IP addresses may be referred to as client public IP addresses, or simply client IP addresses. Instead of being assigned by the provider network 900 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 11:
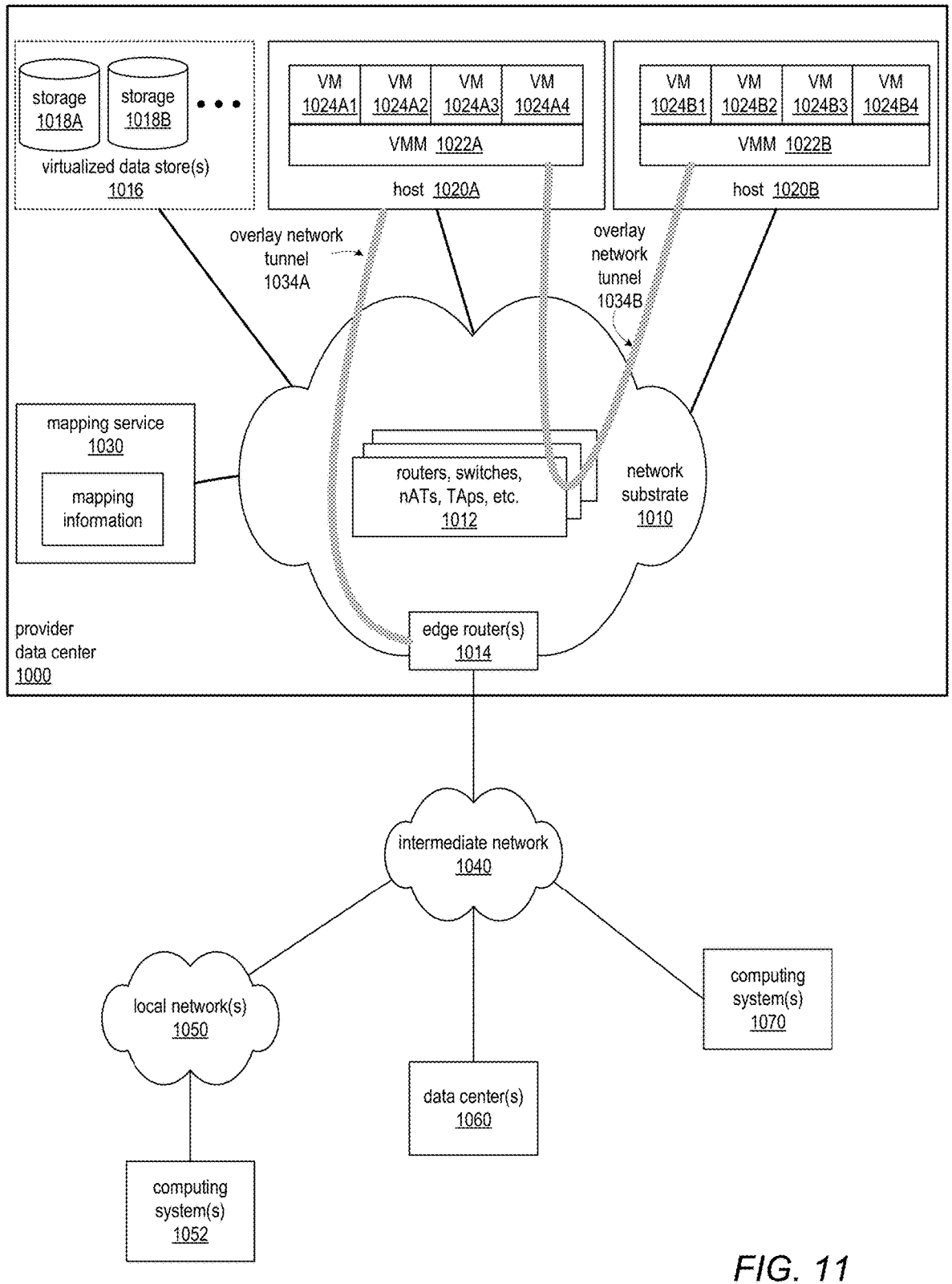
FIG. 11 illustrates an example data center that implements an overlay network on a network substrate using IP tunneling technology, according to some embodiments.

FIG. 11 illustrates an example data center that implements an overlay network on a network substrate using IP tunneling technology, according to at least some embodiments. A provider data center 1000 may include a network substrate that includes networking devices 1012 such as routers, switches, network address translators (NATs), and so on. At least some embodiments may employ an Internet Protocol (IP) tunneling technology to provide an overlay network via which encapsulated packets may be passed through network substrate 1010 using tunnels. The IP tunneling technology may provide a mapping and encapsulating system for creating an overlay network on a network (e.g., a local network in data center 1000 of FIG. 11) and may provide a separate namespace for the overlay layer (the public IP addresses) and the network substrate 1010 layer (the private IP addresses). Packets in the overlay layer may be checked against a mapping directory (e.g., provided by mapping service 1030) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 1030) that knows where the IP overlay addresses are.

In at least some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 11, an example overlay network tunnel 1034A from a virtual machine (VM) 1024A on host 1020A to a device on the intermediate network 1050 and an example overlay network tunnel 1034B between a VM 1024B on host 1020B and a VM 1024C on host 1020C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 11, at least some networks in which embodiments may be implemented may include hardware virtualization technology that enables multiple operating systems to run concurrently on a host computer (e.g., hosts 1020A and 1020B of FIG. 11), i.e. as virtual machines (VMs) 1024 on the hosts 1020. The VMs 1024 may, for example, be rented or leased to clients of a network provider. A hypervisor, or virtual machine monitor (VMM) 1022, on a host 1020 presents the VMs 1024 on the host with a virtual platform and monitors the execution of the VMs 1024. Each VM 1024 may be provided with one or more private IP addresses; the VMM 1022 on a host 1020 may be aware of the private IP addresses of the VMs 1024 on the host. A mapping service 1030 may be aware of all network IP prefixes and the IP addresses of routers or other devices serving IP addresses on the local network. This includes the IP addresses of the VMMs 1022 serving multiple VMs 1024. The mapping service 1030 may be centralized, for example on a server system, or alternatively may be distributed among two or more server systems or other devices on the network. A network may, for example, use the mapping service technology and IP tunneling technology to, for example, route data packets between VMs 1024 on different hosts 1020 within the data center 1000 network; note that an interior gateway protocol (IGP) may be used to exchange routing information within such a local network.

In addition, a network such as the provider data center 1000 network (which is sometimes referred to as an autonomous system (AS)) may use the mapping service technology, IP tunneling technology, and routing service technology to route packets from the VMs 1024 to Internet destinations, and from Internet sources to the VMs 1024. Note that an external gateway protocol (EGP) or border gateway protocol (BGP) is typically used for Internet routing between sources and destinations on the Internet. FIG. 11 shows an example provider data center 1000 implementing a network that provides resource virtualization technology and that provides full Internet access via edge router(s) 1014 that connect to Internet transit providers, according to at least some embodiments. The provider data center 1000 may, for example, provide clients the ability to implement virtual computing systems (VMs 1024) via a hardware virtualization service and the ability to implement virtualized data stores 1016 on storage resources 1018 via a storage virtualization service.

The data center 1000 network may implement IP tunneling technology, mapping service technology, and a routing service technology to route traffic to and from virtualized resources, for example to route packets from the VMs 1024 on hosts 1020 in data center 1000 to Internet destinations, and from Internet sources to the VMs 1024. Internet sources and destinations may, for example, include computing systems 1070 connected to the intermediate network 1040 and computing systems 1052 connected to local networks 1050 that connect to the intermediate network 1040 (e.g., via edge router(s) 1014 that connect the network 1050 to Internet transit providers). The provider data center 1000 network may also route packets between resources in data center 1000, for example from a VM 1024 on a host 1020 in data center 1000 to other VMs 1024 on the same host or on other hosts 1020 in data center 1000.

A service provider that provides data center 1000 may also provide additional data center(s) 1060 that include hardware virtualization technology similar to data center 1000 and that may also be connected to intermediate network 1040. Packets may be forwarded from data center 1000 to other data centers 1060, for example from a VM 1024 on a host 1020 in data center 1000 to another VM on another host in another, similar data center 1060, and vice versa.

While the above describes hardware virtualization technology that enables multiple operating systems to run concurrently on host computers as virtual machines (VMs) on the hosts, where the VMs may be rented or leased to clients of the network provider, the hardware virtualization technology may also be used to provide other computing resources, for example storage resources 1018, as virtualized resources to clients of a network provider in a similar manner.

Figure 12:
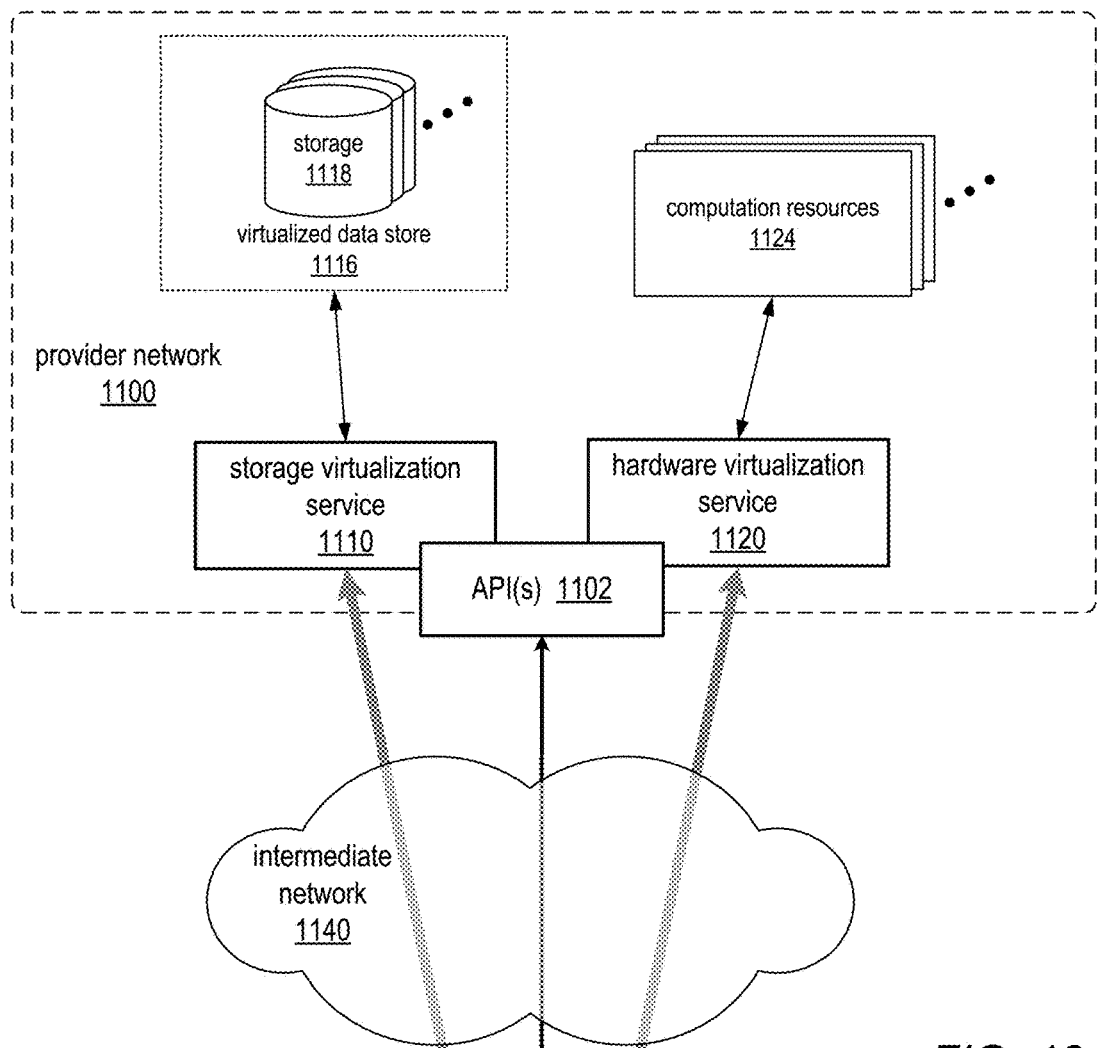
FIG. 12 is a block diagram of an example provider network that provides a storage virtualization service and a hardware virtualization service to clients, according to at least some embodiments.
Figure 12:
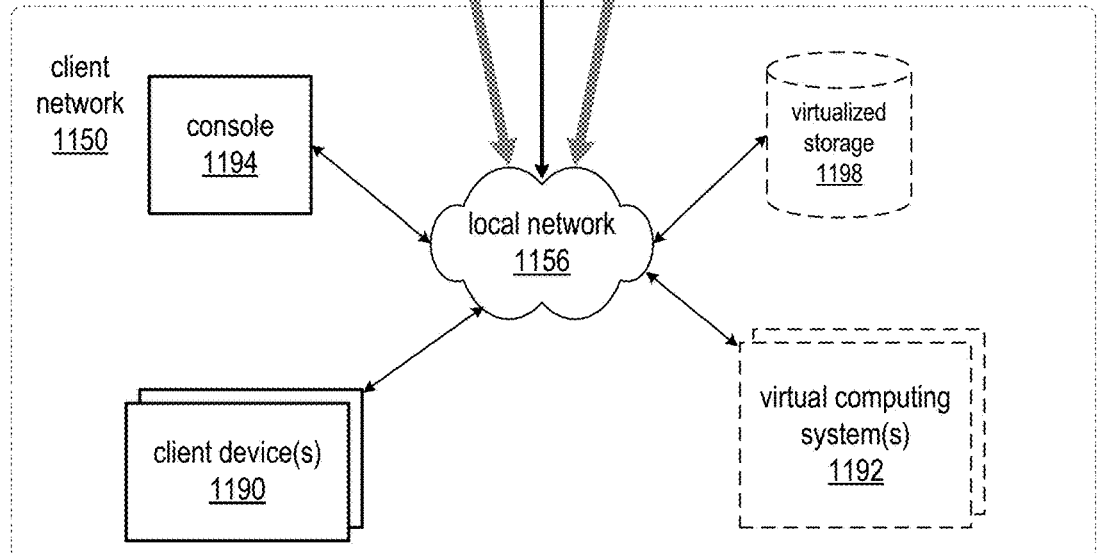

FIG. 12 is a block diagram of an example provider network that provides a storage virtualization service and a hardware virtualization service to clients, according to at least some embodiments. Hardware virtualization service 1120 provides multiple computation resources 1124 (e.g., VMs) to clients. The computation resources 1124 may, for example, be rented or leased to clients of the provider network 1100 (e.g., to a client that implements client network 1150). Each computation resource 1124 may be provided with one or more private IP addresses. Provider network 1100 may be configured to route packets from the private IP addresses of the computation resources 1124 to public Internet destinations, and from public Internet sources to the computation resources 1124.

Provider network 1100 may provide a client network 1150, for example coupled to intermediate network 1140 via local network 1156, the ability to implement virtual computing systems 1192 via hardware virtualization service 1120 coupled to intermediate network 1140 and to provider network 1100. In some embodiments, hardware virtualization service 1120 may provide one or more APIs 1102, for example a web services interface, via which a client network 1150 may access functionality provided by the hardware virtualization service 1120, for example via a console 1194. In at least some embodiments, at the provider network 1100, each virtual computing system 1192 at client network 1150 may correspond to a computation resource 1124 that is leased, rented, or otherwise provided to client network 1150.

From an instance of a virtual computing system 1192 and/or another client device 1190 or console 1194, the client may access the functionality of storage virtualization service 1110, for example via one or more APIs 1102, to access data from and store data to a virtual data store 1116 provided by the provider network 1100. In some embodiments, a virtualized data store gateway (not shown) may be provided at the client network 1150 that may locally cache at least some data, for example frequently accessed or critical data, and that may communicate with virtualized data store service 1110 via one or more communications channels to upload new or modified data from a local cache so that the primary store of data (virtualized data store 1116) is maintained. In at least some embodiments, a user, via a virtual computing system 1192 and/or on another client device 1190, may mount and access virtual data store 1116 volumes, which appear to the user as local virtualized storage 1198.

While not shown in FIG. 12, the virtualization service(s) may also be accessed from resource instances within the provider network 1100 via API(s) 1102. For example, a client, appliance service provider, or other entity may access a virtualization service from within a respective private network on the provider network 1100 via an API 1102 to request allocation of one or more resource instances within the private network or within another private network.

FIG. 13 illustrates an example provider network that provides private networks on the provider network to at least some clients, according to at least some embodiments. A client's virtualized private network 1260 on a provider network 1200, for example, enables a client to connect their existing infrastructure (e.g., devices 1252) on client network 1250 to a set of logically isolated resource instances (e.g., VMs 1224A and 1224B and storage 1218A and 1218B), and to extend management capabilities such as security services, firewalls, and intrusion detection systems to include their resource instances.

A client's virtualized private network 1260 may be connected to a client network 1250 via a private communications channel 1242. A private communications channel 1242 may, for example, be a tunnel implemented according to a network tunneling technology or some other technology over an intermediate network 1240. The intermediate network may, for example, be a shared network or a public network such as the Internet. Alternatively, a private communications channel 1242 may be implemented over a direct, dedicated connection between virtualized private network 1260 and client network 1250.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In at least some embodiments, either a shared network or a public network may serve as an intermediate network between a provider network and a client network.

To establish a virtualized private network 1260 for a client on provider network 1200, one or more resource instances (e.g., VMs 1224A and 1224B and storage 1218A and 1218B) may be allocated to the virtualized private network 1260. Note that other resource instances (e.g., storage 1218C and VMs 1224C) may remain available on the provider network 1200 for other client usage. A range of public IP addresses may also be allocated to the virtualized private network 1260. In addition, one or more networking devices (routers, switches, etc.) of the provider network 1200 may be allocated to the virtualized private network 1260. A private communications channel 1242 may be established between a private gateway 1262 at virtualized private network 1260 and a gateway 1256 at client network 1250.

In at least some embodiments, in addition to, or instead of, a private gateway 1262, virtualized private network 1260 may include a public gateway 1264 that enables resources within virtualized private network 1260 to communicate directly with entities (e.g., network entity 1244) via intermediate network 1240, and vice versa, instead of or in addition to via private communications channel 1242.

Virtualized private network 1260 may be, but is not necessarily, subdivided into two or more subnetworks, or subnets, 1270. For example, in implementations that include both a private gateway 1262 and a public gateway 1264, the private network may be subdivided into a subnet 1270A that includes resources (VMs 1224A and storage 1218A, in this example) reachable through private gateway 1262, and a subnet 1270B that includes resources (VMs 1224B and storage 1218B, in this example) reachable through public gateway 1264.

The client may assign particular client public IP addresses to particular resource instances in virtualized private network 1260. A network entity 1244 on intermediate network 1240 may then send traffic to a public IP address published by the client; the traffic is routed, by the provider network 1200, to the associated resource instance. Return traffic from the resource instance is routed, by the provider network 1200, back to the network entity 1244 over intermediate network 1240. Note that routing traffic between a resource instance and a network entity 1244 may require network address translation to translate between the public IP address and the private IP address of the resource instance.

At least some embodiments may allow a client to remap public IP addresses in a client's virtualized private network 1260 as illustrated in FIG. 13 to devices on the client's external network 1250. When a packet is received (e.g., from network entity 1244), the network 1200 may determine that the destination IP address indicated by the packet has been remapped to an endpoint on external network 1250 and handle routing of the packet to the respective endpoint, either via private communications channel 1242 or via the intermediate network 1240. Response traffic may be routed from the endpoint to the network entity 1244 through the provider network 1200, or alternatively may be directly routed to the network entity 1244 by the client network 1250. From the perspective of the network entity 1244, it appears as if the network entity 1244 is communicating with the public IP address of the client on the provider network 1200. However, the network entity 1244 has actually communicated with the endpoint on client network 1250.

While FIG. 13 shows network entity 1244 on intermediate network 1240 and external to provider network 1200, a network entity may be an entity on provider network 1200. For example, one of the resource instances provided by provider network 1200 may be a network entity that sends traffic to a public IP address published by the client.

FIG. 14 illustrates subnets and security groups in an example virtual private network implementation on a provider network, according to at least some embodiments.

In at least some embodiments, a provider network such as provider network 1200 in FIG. 13 may allow the client to establish and manage virtual security groups 1316 within the client's virtual private network 1310, within or across subnets 1314. A security group 1316 acts as a virtual firewall that controls the traffic allowed to reach one or more resource instances 1318 within the security group 1316. The client may establish one or more security groups 1316 within the private network 1310, and may associate each resource instance 1318 in the private network 1310 with one or more of the security groups 1316. In at least some embodiments, the client may establish and/or modify rules for each security group 1316 that control the inbound traffic allowed to reach the resource instances 1318 associated with the security group 1316.

In the example virtual private network 1310 shown in FIG. 14, the private network 1310 is subdivided into two subnets 1314A and 1314B. Access to the private network 1310 is controlled by gateway(s) 1330. Each subnet 1314 may include at least one router 1312 that acts to route traffic to (and from) resource instances 1318 on the respective subnet 1314. In some embodiments, network access control lists (ACLs) may be used to control access to the subnets 1314 at router(s) 1312. In the example shown in FIG. 14, resource instances 1318A through 1318E are on subnet 1314A, and resource instances 1318F through 1318J are on subnet 1314B. The client has established four security groups 1316A through 1316D. As shown in FIG. 14, a security group may extend across subnets 1314, as does security group 1316A that includes resource instances 1318A and 1318B on subnet 1314A and resource instance 1318F on subnet 1314B. In addition, a resource instance 1318 may be included in two or more security groups 1316, as is resource instance 1318A which is included in security group 1316A and 1316B.

Illustrative System

In at least some embodiments, a server that implements a portion or all of the methods and apparatus for providing network instances for resources in provider network environments as described herein may include a general-purpose computer system that includes or is configured to access one or more computer-accessible media, such as computer system 2000 illustrated in FIG. 15. In the illustrated embodiment, computer system 2000 includes one or more processors 2010 coupled to a system memory 2020 via an input/output (I/O) interface 2030. Computer system 2000 further includes a network interface 2040 coupled to I/O interface 2030.

In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

System memory 2020 may be configured to store instructions and data accessible by processor(s) 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing network instances for resources in provider network environments, are shown stored within system memory 2020 as code 2025 and data 2026.

In one embodiment, I/O interface 2030 may be configured to coordinate I/O traffic between processor 2010, system memory 2020, and any peripheral devices in the device, including network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments some or all of the functionality of I/O interface 2030, such as an interface to system memory 2020, may be incorporated directly into processor 2010.

Network interface 2040 may be configured to allow data to be exchanged between computer system 2000 and other devices 2060 attached to a network or networks 2050, such as other computer systems or devices as illustrated in FIGS. 1 through 15, for example. In various embodiments, network interface 2040 may support communication via any suitable wired or wireless general data networks, such as types of Ethernet network, for example. Additionally, network interface 2040 may support communication via telecommunications/telephony networks such as analog voice networks or digital fiber communications networks, via storage area networks such as Fibre Channel SANs, or via any other suitable type of network and/or protocol.

In some embodiments, system memory 2020 may be one embodiment of a computer-accessible medium configured to store program instructions and data as described above for FIGS. 1 through 10 for implementing embodiments of methods and apparatus for providing network instances for resources in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 2000 via I/O interface 2030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computer system 2000 as system memory 2020 or another type of memory. Further, a computer-accessible medium may include transmission media or signals such as electrical, electromagnetic, or digital signals, conveyed via a communication medium such as a network and/or a wireless link, such as may be implemented via network interface 2040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc, as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
a provider network comprising a client network and a host device implementing a plurality of virtual machines (VMs), the client network comprising one or more VMs of the plurality of VMs;
a network processing device on the host device configured to process packets between the provider network and the plurality of VMs on the host device according to provider network packet processing functionality;
a provider network service implemented by one or more computing devices and comprising an application programming interface (API), wherein the provider network service is configured to receive, from a client of the provider network via the API, a client network instance comprising executable code implementing client packet processing functionality and, responsive to receipt of the client network instance, install the client network instance on the network processing device to implement the client packet processing functionality for the client network, wherein the client packet processing functionality modifies the provider network packet processing functionality on behalf of the client of the provider network, wherein the client network instance is configured to:
obtain incoming packets targeted at respective ones of the one or more VMs on the host device;
apply the client packet processing functionality to the incoming packets; and
output at least some of the incoming packets for delivery to the respective ones of the one or more VMs on the host device.

2. The system as recited in claim 1, wherein the client network instance is further configured to:
obtain outgoing packets from the one or more VMs on the host device;
apply the client packet processing functionality to the outgoing packets; and
output at least some of the outgoing packets for delivery to respective target endpoints via the provider network.

3. The system as recited in claim 1, wherein the host device comprises a plurality of network processing devices coupled to a host I/O interface of the host device, wherein the client network instance is instantiated on at least two of the plurality of network processing devices on the host device, wherein each of the client network instances maintains state information for the client packet processing functionality on the respective network processing device, and wherein the client network instances are configured to share the state information for the client packet processing functionality according to the host I/O interface.

4. The system as recited in claim 1, further comprising:
two or more client networks implemented on the provider network each containing a different subset of the plurality of VMs on the host device;
two or more client network instances on the network processing device, each client network instance modifying or replacing at least part of the provider network packet processing functionality for one or more VMs within a respective one of the two or more client networks with client packet processing functionality specific to the respective client network on behalf of a client of the provider network.

5. The system as recited in claim 1, wherein the network processing device couples to a host I/O interface of the host device, and wherein the network processing device comprises:
a memory configured to store the client network instance;
one or more processors configured to execute the client packet processing functionality of the client network instance; and
a network port configured to couple to the provider network;
wherein the network processing device is configured to:
send outgoing packets onto the provider network and receive incoming packets from the provider network via the network port; and
obtain outgoing packets from the VMs on the host device and provide incoming packets to the VMs on the host device.

6. The system as recited in claim 1, wherein the provider network service is further configured to receive input from a client via the API to:
configure and manage VMs on the host device as client resource instances on the provider network.

7. A method, comprising:
installing, at a network processing device on a host device coupled to a provider network, a client network instance comprising executable code implementing client packet processing functionality for a client network responsive to receipt of the client network instance from a client via an application programming interface (API);
receiving, at the network processing device, provider network packets from the provider network targeted at virtual machines (VMs) on the host device, wherein one or more of the VMs on the host device are resources of a client network implemented on the provider network, and wherein each of the provider network packets include provider network metadata and encapsulates a client packet according to a provider network encapsulation protocol;
processing, by the network processing device, the provider network metadata of the provider network packets according to provider network packet processing functionality implemented by the network processing device;
processing, by the client network instance on the network processing device, the client packets encapsulated in the provider network packets and targeted at the one or more VMs according to client packet processing functionality for the client network, wherein the client packet processing functionality modifies the provider network packet processing functionality on behalf of a client of the provider network; and
outputting, by the client network instance, at least some of the client packets for delivery to respective ones of the VMs on the host device.

8. The method as recited in claim 7, further comprising checking, by the provider network packet processing functionality implemented by the network processing device, the client packets processed by the client network instance for compliance with provider network protocols including provider network security and isolation protocols that provide security for and isolation of client data and client resources on the provider network.

9. The method as recited in claim 7, wherein the client network instance executes within a virtualization environment on the network processing device that provides hypervisor-based security and isolation for client network instances executing on the network processing device to ensure that the client network instances do not violate provider network security and isolation protocols that provide security for and isolation of client data and client resources on the provider network.

10. The method as recited in claim 7, further comprising:
providing, by the provider network, a domain-specific programming language and application programming interface (API) for developing client network instances;
receiving, by the provider network, client network instance code developed according to the domain-specific programming language and API;
compiling, on the provider network, the client network instance code to generate the client network instance, wherein said compiling verifies the client network instance code to ensure that the client network instance does not violate provider network security and isolation protocols that provide security for and isolation of client data and client resources on the provider network; and
instantiating the compiled and verified client network instance on the network processing device.

11. The method as recited in claim 7, further comprising:
receiving, by the provider network, client input indicating the client network instance and a resource instance corresponding to the client network instance;
providing the client network instance and the resource instance to a virtual machine monitor (VMM) on the host device, wherein the VMM manages a virtualization environment on the host device in which the VMs execute;
providing, by the VMM, the client network instance to the network processing device;
instantiating, by the network processing device, the client network instance in a virtualization environment on the network processing device; and
instantiating, by the VMM, the resource instance as a VM in the virtualization environment on the host system managed by the VMM.

12. The method as recited in claim 7, further comprising:
allocating processor cycles on the network processing device during a specified period or tokens for the specified period to the client network instance;
monitoring execution of the client network instance on the network processing device according to the allocated processor cycles or tokens; and
stop processing of the client network instance upon determining that the client network instance has exhausted its allocated processor cycles or tokens for the specified period.

13. The method as recited in claim 7, further comprising:
receiving, at the network processing device, outgoing client packets from the one or more VMs on the host device;
processing, by the client network instance, the outgoing client packets according to the client packet processing functionality; and
outputting, by the client network instance, at least some of the outgoing client packets for delivery to respective endpoints.

14. The method as recited in claim 13, further comprising:
processing, by the network processing device, the outgoing client packets output by the client network instance according to the provider network packet processing functionality to generate outgoing provider network packets, wherein said processing checks the outgoing client packets output by the client network instance for compliance with provider network protocols and encapsulates the outgoing client packets according to the provider network encapsulation protocol; and
sending, by the network processing device, the outgoing provider network packets onto the provider network for routing to the respective endpoints.

15. The method as recited in claim 7, wherein the host device comprises a plurality of network processing devices coupled to a host I/O interface of the host device, the method further comprising installing the client network instance on at least two of the plurality of network processing devices on the host device.

16. The method as recited in claim 15, wherein the host I/O interface includes a Peripheral Component Interconnect (PCI) bus.

17. The method as recited in claim 15, further comprising:
maintaining, by each of the client network instances, state information for the client packet processing functionality on the respective network processing device; and sharing, by the client network instances, the state information for the client packet processing functionality according to the host I/O interface.

18. The method as recited in claim 7, wherein the client network instance is a resource on the client network, the method further comprising configuring and managing the VMs and the client network instance on the client network according to client input to an application programming interface (API) to a provider network service of the provider network.

19. The method as recited in claim 7, wherein the client packet processing functionality modifies or replaces at least part of the provider network packet processing functionality for the VMs on the host device.

20. A network processing device, comprising:
one or more ports configured to couple to a provider network comprising a plurality of host devices each implementing a plurality of resources;
a memory configured to store a client network instance that implements client packet processing functionality for a client network implemented on the provider network; and
one or more processors configured to execute provider network packet processing functionality and the client packet processing functionality of the client network instance, wherein the client packet processing functionality modifies the provider network packet processing functionality on behalf of a client of the provider network;
wherein the network processing device is configured to:
couple to a host I/O interface of a host device on the provider network, wherein the host device implements a plurality of virtual machines (VMs), wherein one or more of the VMs are resources of the client network;
install the client network instance to the memory responsive to receipt of the client network instance comprising executable code from a client of the provider network;
process at least some packets between the provider network and the plurality of VMs on the host device according to the provider network packet processing functionality;
obtain incoming packets targeted at respective ones of the one or more of the VMs on the host device via the one or more ports;
execute the client packet processing functionality of the installed client network instance to process the incoming packets targeted at the VMs according to the client packet processing functionality; and
output at least some of the processed incoming packets via the host I/O interface for delivery to the respective ones of the one or more VMs on the host device.

21. The network processing device as recited in claim 20, wherein the network processing device is further configured to:
obtain outgoing packets from the one or more of the VMs on the host device via the host I/O interface;
execute the client packet processing functionality of the client network instance to process the outgoing packets according to the client packet processing functionality; and
output at least some of the outgoing packets via the one or more ports for delivery to respective target endpoints via the provider network.

22. The network processing device as recited in claim 20, wherein the host device comprises a plurality of network processing devices coupled to the host I/O interface, wherein client network instances are instantiated on at least two of the plurality of network processing devices on the host device, wherein each of the client network instances maintains state information for the client packet processing functionality on the respective network processing device, and wherein the client network instances are configured to share the state information for the client packet processing functionality according to the host I/O interface.

23. The network processing device as recited in claim 20, wherein the memory stores a plurality of client network instances, and wherein the network processing device comprises a scheduler component configured to allocate processor cycles to the plurality of client network instances and to stop processing of a given client network instance that exceeds its allocated processor cycles.

* * * * *